United States Patent [19]
Yoshida et al.

[11] Patent Number: 5,659,445
[45] Date of Patent: Aug. 19, 1997

[54] RECORDING DISK APPARATUS AND ROTATIONAL SUPPORTING STRUCTURE THEREFOR HAVING IMPROVED LUBRICATION ARRANGEMENT

[75] Inventors: Takashi Yoshida; Takashi Kono; Kenji Tomida, all of Ibaraki-ken; Tomoaki Inoue, Mito; Masaaki Nakano, Hitachi; Hideaki Amano, Odawara; Kenji Mori, Hadano, all of Japan

[73] Assignee: Hitachi, Ltd., Tokyo, Japan

[21] Appl. No.: 357,303

[22] Filed: Dec. 13, 1994

[30] Foreign Application Priority Data

| Dec. 14, 1993 | [JP] | Japan | 5-313265 |
| Dec. 21, 1993 | [JP] | Japan | 5-321564 |
| Jan. 17, 1994 | [JP] | Japan | 6-002960 |

[51] Int. Cl.⁶ ............... G11B 17/08; F16C 32/06
[52] U.S. Cl. .............. 360/98.07; 384/112; 384/118; 384/123; 310/90
[58] Field of Search ............ 360/98.07, 99.04, 360/99.08; 384/107, 111, 112, 120, 118, 123, 133; 310/90, 90.5, 67 R

[56] References Cited

U.S. PATENT DOCUMENTS

| 4,348,065 | 9/1982 | Yoshioka et al. | 384/121 |
| 4,383,771 | 5/1983 | Freytag et al. | 384/121 |
| 4,526,484 | 7/1985 | Stahl et al. | 384/133 |
| 4,602,873 | 7/1986 | Izumi et al. | 384/118 |
| 4,747,705 | 5/1988 | Agrawal | 384/118 |
| 4,938,611 | 7/1990 | Nii et al. | 384/133 |
| 4,998,033 | 3/1991 | Hisabe et al. | 360/98.07 |
| 5,357,162 | 10/1994 | Aiyoshizawa et al. | 310/90 |
| 5,381,285 | 1/1995 | Dona | 360/98.07 |
| 5,399,141 | 3/1995 | Takahashi | 384/123 |
| 5,430,590 | 7/1995 | Ainslie et al. | 360/98.07 |
| 5,448,120 | 9/1995 | Schaule et al. | 360/98.07 |
| 5,457,588 | 10/1995 | Hattori et al. | 360/98.07 |
| 5,463,511 | 10/1995 | Nakano et al. | 360/98.07 |
| 5,504,637 | 4/1996 | Asada et al. | 360/98.07 |

FOREIGN PATENT DOCUMENTS

| 59-110961 | 6/1984 | Japan . |
| 1-234662 | 9/1989 | Japan . |
| 3-89079 | 4/1991 | Japan . |
| 3-272318 | 12/1991 | Japan . |
| 4-6667 | 1/1992 | Japan . |
| 5-321928 | 12/1993 | Japan . |

*Primary Examiner*—Jefferson Evans
*Attorney, Agent, or Firm*—Antonelli, Terry, Stout & Kraus, LLP.

[57] ABSTRACT

A recording disk apparatus comprises a clearance between a shaft and a thrust bearing portion tapered in a circumferential direction, a lubricant communication groove of a bearing covered by the shaft so that a lubricant on a radial bearing portion communicates with the lubricant on the thrust bearing portion through the lubricant communication groove, a lubricant circulating path which extends axially from the thrust bearing portion to the radial bearing portion to prevent the lubricant flowing out of the thrust bearing portion from returning directly to the thrust bearing portion without passing the radial bearing portion, and/or a clearance between a slide bearing and a magnetic fluid seal device substantially filled with a magnetic fluid lubricant.

25 Claims, 23 Drawing Sheets

RECORDING DISK APPARATUS AND ROTATIONAL SUPPORTING STRUCTURE THEREFOR HAVING IMPROVED LUBRICATION ARRANGEMENT

BACKGROUND OF THE INVENTION

The present invention relates to a recording disk apparatus in which signals are recorded onto and/or read out from a recording disk through a magnetic or optical (electro-optical, magneto-optical or the like) head while the recording disk is rotated by a motor and the head is moved by a servomotor, and to a recording disk rotating apparatus for supporting and driving the recording disk to be rotated in the recording disk apparatus.

In the prior-art rotational supporting structures for recording devices and the prior-art magnetic fluid seals therefor, a magnet for providing a magnetic fluid seal is arranged at a rotary side and a thrust bearing portion has spiral or herring-bone lubricant grooves as disclosed in JPA Hei 3-272318, a magnet for magnetic fluid bearing lubricant is arranged at a stationary side and the thrust bearing portion has a magnet bearing as disclosed in JPA Hei 4-6667, the magnetic fluid seal is used for a ball-bearing spindle as disclosed in JPA Hei 3-89079, and the magnetic fluid seal has projections extending from the magnet toward a shaft as disclosed in JPA Sho 59-110961 and JPA Hei 1-234662.

SUMMARY OF THE INVENTION

An object of the present invention is to provide a structure for improving a lubricating condition between a stationary member and a rotary member with the recording disk thereon.

According to the present invention, a recording disk apparatus comprises, a disk for recording a signal thereon, a rotary member on which the disk is mounted, a rotational supporting device including a shaft and a bearing, one of the shaft and bearing being incorporated with the rotary member to rotate therewith and being rotatable relative to another one thereof on an axis, and a lubricant in the rotational supporting device, wherein the bearing has a thrust bearing portion for generating a dynamic lubricant pressure between the shaft and bearing in a thrust direction substantially parallel to the axis according to the rotation of the rotary member, and a radial bearing portion for generating another dynamic lubricant pressure between the shaft and bearing in a radial direction substantially perpendicular to the axis according to a rotation of the rotary member, and a clearance between the shaft and the thrust bearing portion is tapered in a circumferential direction so that the dynamic lubricant pressure is increased in the clearance according to the rotation of the rotary member.

In the present invention, since the dynamic lubricant pressure in the thrust direction is increased by the tapered clearance, the disk is stable or stationary in the thrust direction when being rotated.

The bearing may have an end surface or land facing closely to the shaft in an axial direction so that the end surface or land surrounds the thrust bearing portion in the circumferential direction at a radially outer side of the thrust bearing portion to throttle a radially outward flow of the lubricant out of the thrust bearing portion, in order to further increase the dynamic lubricant pressure in the thrust direction and to decrease the flow of the lubricant toward a magnet fluid seal.

A position of terminating end of a the tapered clearance at which an axial distance between the thrust bearing portion and the shaft is substantially smallest in the thrust bearing portion may be substantially equal in the circumferential direction to that of another tapered clearance at which a radial distance between a radial bearing portion and the shaft is substantially smallest in the radial bearing portion, in order to balance substantially the highest lubricant pressure in the thrust bearing portion with the highest lubricant pressure in the radial bearing portion. The thrust bearing portion may extend radially to the radial bearing portion to form a fluidal communication therebetween, in order to balance substantially the lubricant pressure in the thrust bearing portion with the lubricant pressure in the radial bearing portion and to prevent a lubricant insufficiency in the radial bearing portion or the thrust bearing portion. The bearing may have another end surface or land facing closely to the shaft in the axial direction so that the end surface extends in the circumferential direction between the thrust bearing portion and the radial bearing portion to prevent the fluidal communication therebetween, in order to further increase the dynamic lubricant pressure in the thrust direction.

An axial center of the radial bearing portion may be arranged within an axial width of the disk, such that an eccentric force of the disk is effectively born by the radial bearing portion to make the disk stable in the radial direction when being rotated.

A recording disk apparatus of the present invention may include a lubricant communication groove extending radially on the bearing between the radial and thrust bearing portions and covered by the shaft so that the lubricant on the radial bearing portion communicates with the lubricant on the thrust bearing portion through the lubricant communication groove, in order to generate the lubricant flow toward both the thrust and radial bearing portions by a relative rotation between the bearing and shaft.

A recording disk apparatus of the present invention may have a lubricant circulating path which extends axially from the thrust bearing portion to the radial bearing portion to prevent the lubricant flowing radially outward out of the thrust bearing portion from returning directly to the thrust bearing portion without passing the radial bearing portion, in order to prevent a significantly disturbed or reversed flow of the lubricant flowing out of the thrust bearing portion and to make temperatures of the lubricant and bearing substantially constant over the whole thereof. The lubricant circulating path can be formed on the bearing or the hub.

A recording disk apparatus of the present invention comprises, a disk for recording a signal thereon, a rotary member on which the disk is mounted, a stationary member on which the rotary member is supported, a slide bearing which includes a shaft and a bearing one of which is incorporated with the rotary member to form a rotary side and another one of which is incorporated with the stationary side to form a stationary side, for generating a dynamic lubricant pressure to support the rotary member on the stationary member in a rotatable manner on an axis when the rotary member is rotated, a magnetic fluid lubricant, and a magnetic fluid seal device including a magnet holding the magnetic fluid lubricant between the rotary side and the stationary side, wherein a clearance between the slide bearing and the magnetic fluid seal device is substantially filled with the magnetic fluid lubricant.

Since the clearance between the slide bearing and the magnetic fluid seal device is substantially filled with the magnetic fluid lubricant, that is, the clearance between the slide bearing and the magnetic fluid seal device does not include substantially an air whose expansion and contraction coefficient relative to a variation of temperature is significantly large in comparison with that of the magnetic fluid lubricant and which deteriorates a lubricant or friction-decreasing characteristic when being included by the lubricant, an expansion and contraction of the air therebetween does not occur and a position of the magnetic fluid lubricant at the magnetic fluid seal device is not changed according to the variation of temperature so that the magnetic fluid lubricant is kept stable at the magnetic fluid seal device to prevent a leakage or removal of the magnetic fluid lubricant from the magnetic fluid seal device, and an air-absorption of the magnetic fluid lubricant is prevented to keep a lubrication condition in the slide bearing at a desired degree.

The magnetic fluid seal device may be arranged at a radially outer side of the thrust bearing portion, in order to decelerate an injecting flow of the magnetic fluid lubricant toward the magnetic fluid seal device from the thrust bearing portion. The stationary and rotary sides may face close to each other at the radially outer side of the thrust bearing portion to throttle a radial flow of the lubricant from the thrust bearing portion to the magnetic fluid seal device, in order to prevent or decelerate a flow of the magnetic fluid lubricant toward the magnetic fluid seal device from the thrust bearing portion. The magnetic fluid seal device may be arranged at a radially outer side of the radial bearing portion, in order to decelerate an injecting flow of the magnetic fluid lubricant toward the magnetic fluid seal device from the radial bearing portion.

One of the rotary side and the stationary side may have a helical or screw groove extending on an inner or outer periphery thereon to face to another one thereof and inclined to an imaginary plane perpendicular to the rotational axis to urge axially the air of the outside of the magnetic fluid seal device according to a rotation of the rotary member from an outside of the apparatus toward the magnetic fluid seal device, in order to prevent the leakage or removal of the magnetic fluid lubricant from the magnetic fluid seal device.

A magnetic flux generated by the magnet on one of the rotary and stationary sides may pass through the slide bearing of magnetic conductivity to be transmitted therethrough to another one of the rotary and stationary sides so that the slide bearing is surrounded by the magnet and both the magnet and the slide bearing exist at the same axial position, in order to make the slide bearing as axially long as possible. The magnetic fluid seal device may have a magnetically conductive steel member connected magnetically to the magnet and holding the magnetic fluid at a front end thereof, and a force in the thrust direction may be transmitted between the stationary and rotary sides through the magnetically conductive steel member as a thrust slide plate, in order to arrange continuously the slide bearing and the magnetic fluid seal device in the axial direction and to arrange the magnetic fluid seal device as radially inward as possible.

One of the shaft and bearing (incorporated with one of the rotary and stationary members) may have or be made of a magnet for rotational support of the rotary member, and another one thereof (incorporated with another one of the rotary and stationary members) may have a non-magnetic part or be made of a non-magnetic material facing close to this magnet, wherein the magnet includes a pair of N-pole and S-pole, and a boundary of the N-pole and S-pole is inclined to an imaginary plane perpendicular to the axis or a circumferential direction of the axis to hold the magnetic fluid lubricant along the boundary so that the magnetic fluid lubricant on the magnet is urged axially or radially according to the rotation of the rotary member to increase the dynamic lubricant pressure in the thrust direction.

DETAILED DESCRIPTION OF PREFERRED EMBODIMENTS

Figure 1:
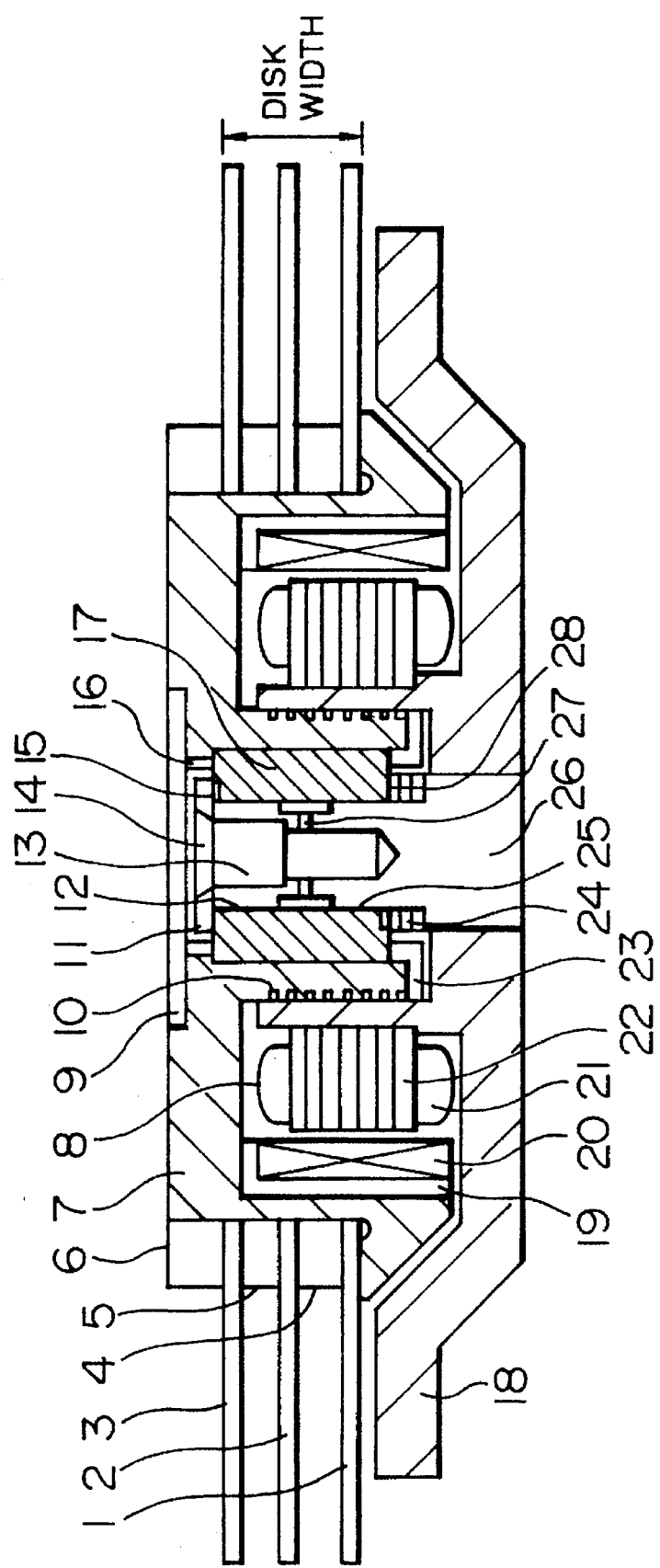
FIG. 1 is a cross-sectional view showing a recording disk apparatus with a recording disk rotating apparatus of the present invention.

In a recording disk rotating apparatus shown in FIG. 1, a shaft 26 and a magnetic coil stator 8 are fixed to a base 18 with an adhesive. The shaft 26 has a thread hole 13 for a screw 14, a lubricant hole 27, a magnet assembly 11 for holding a magnetic fluid as a thrust member fixed to the screw 14 with the adhesive and a magnet assembly 24 which operates as a thrust ring and another magnet for holding a magnetic fluid. The magnetic coil stator 8 has stacked steel plates 22 and electro-magnetic coils 21 to rotate a hub 7 through permanent magnets 20 thereon. The hub 7 has a bush 17, a yoke 19 receiving the permanent magnets 20, a magnetically conductive member 16 with another magnet for holding the magnetic fluid, a magnetically conductive member 23, and a cover 9. On the bush 17, radial bearing portions 12 and 25, and thrust bearing portions 15 and 28 are formed. A magnetic fluid is arranged between the magnet assembly 24 and magnetically conductive member 23 and between the magnet assembly 11 and a magnetically conductive member 16 to seal a clearance between a rotary members assembly and a stationary members assembly against the atmosphere at an outside of the recording disk rotating apparatus. When the magnetic fluid is a magnetic fluid lubricant, it is preferable to fill the clearance at an inside of the combination of the magnet assembly 24 and magnetically conductive member 23, that is, the clearance between a magnetic seal device and a slide bearing, with the magnetic fluid lubricant.

The hub 7 further includes a helical or screw groove 10 to urge or pressurize the air therealong toward the magnetic seal device to prevent a leakage of the magnetic fluid or lubricant from the magnetic seal device according to a rotation of the hub 7. Recording disks 1, 2, 3 are set on the hub 7 with fixed axial distances therebetween by spacers 4 and 5 after a clamp ring 6 is fixed to the hub 7 by the adhesive. An axial center of the radial bearing portions 12 and 25 is arranged within an axial disk width so that a moment force by a radial eccentricity of the disks 1–3 is decreased.

Figure 2:
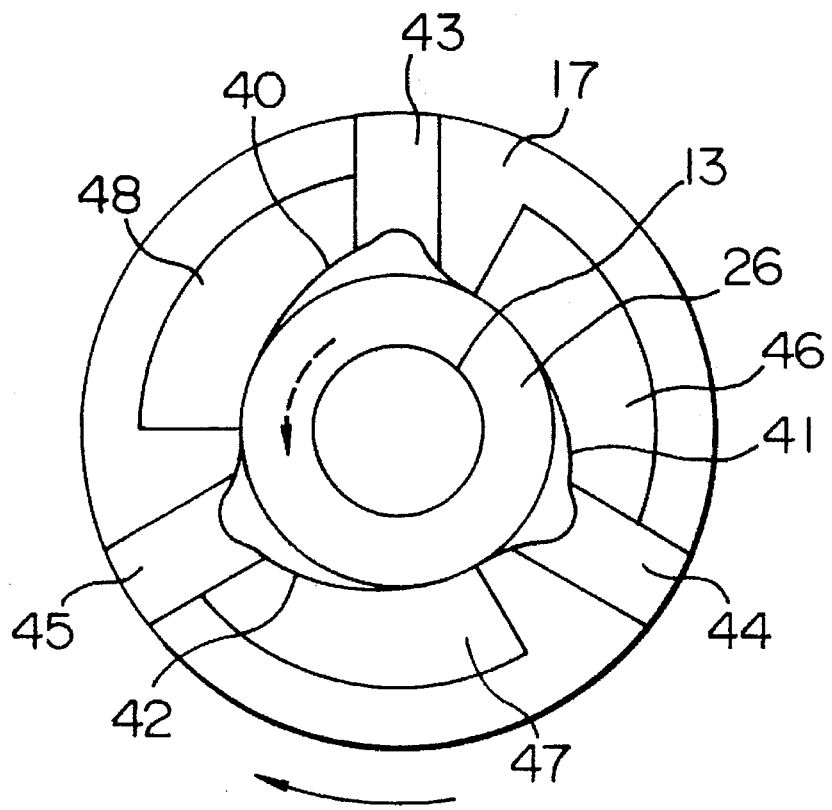
FIG. 2 is a side view of slide bearing of the present invention showing a lubricant communication groove, a thrust bearing portion and a radial bearing portion.
Figure 3:
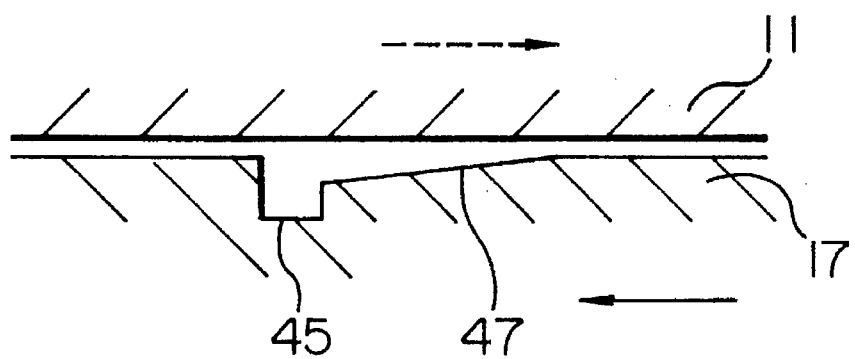
FIG. 3 is a cross-sectional view along a circumferential direction of the slide bearing of FIG. 2 showing the thrust bearing portion tapered in the circumferential direction.

As shown in FIG. 2, the radial bearing portions 12 and 25 of the bush 17 are formed by three circular arcs 40–42 which extend parallel to a rotational axis and whose circular centers are not arranged on the rotational axis. As shown in FIG. 3, a thrust bearing portion 28 is formed on tapered grooves 46–48 of the bush 17. The lubricant fills substantially a space between the thrust member 11 and the magnetically conductive member 23 to generate a dynamic lubrication pressure. Wedge-shaped clearances between the bush 17 and the shaft 26 decrease their radial distances between the circular arcs 40–42 and the shaft 26 and their axial distances between the tapered grooves 46–48 and the shaft 26, in a common circumferential direction from lubricant communication grooves 43–45. In FIGS. 2, 3, 20–28 and 38, dot line arrows donate a shaft moving direction when the bush 17 is incorporated with the claimed stationary member, and solid line arrows donate a bush moving direction when the shaft 17 is incorporated with the claimed stationary member.

Figure 4:
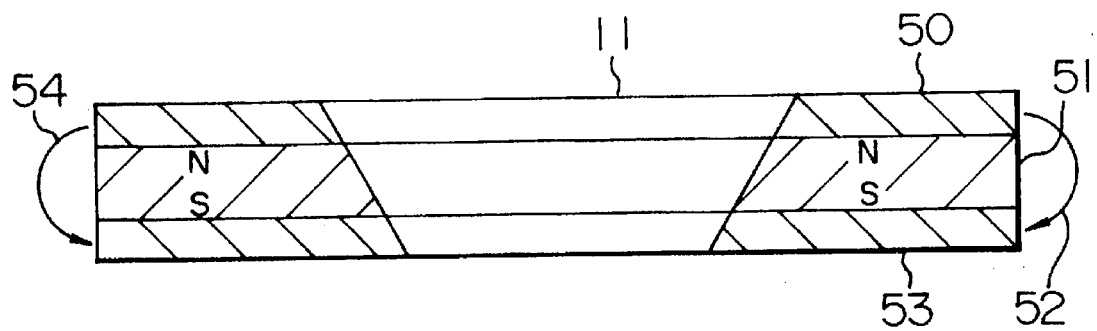
FIG. 4 is a cross-sectional view showing an assembly of a magnet and magnetically conductive members for a magnetic fluid seal device.
Figure 5:
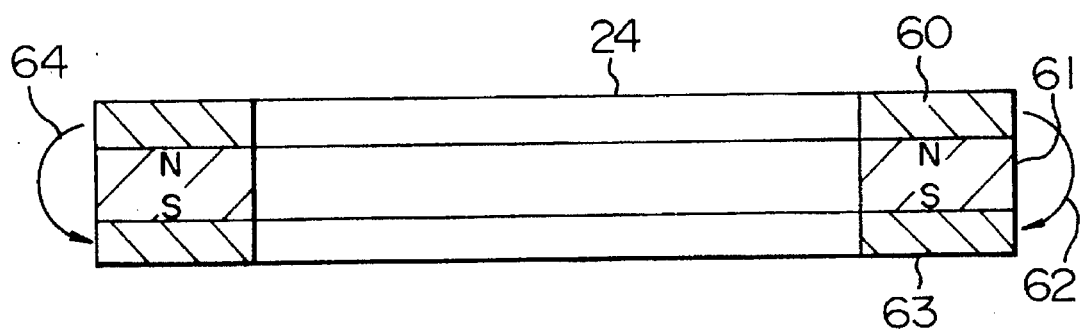
FIG. 5 is a cross-sectional view showing another assembly of a magnet and magnetically conductive members for a magnetic fluid seal device.

As shown in FIG. 4, the magnet assembly 11 has magnetically conductive steel members 50 and 53 and a magnet 51 therebetween so that a magnetic flux generated axially by the magnet 51 is bent through the magnetically conductive steel members 50 and 53 to extend radially and the magnetically conductive steel member 53 as a thrust plate contacts with the bush 17 on the thrust bearing portion. As shown in FIG. 5, the magnet assembly 24 fixed to the shaft 26 has magnetically conductive steel members 60 and 63 and a magnet 61 therebetween so that another magnetic flux generated axially by the magnet 61 is bent through the magnetically conductive steel members 60 and 63 to extend radially and the magnetically conductive steel member 60 as a thrust plate contacts with the bush 17 on the thrust bearing portion 28.

Figure 6:
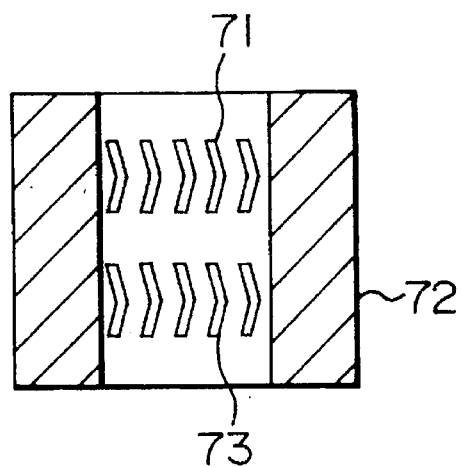
FIG. 6 is a cross-sectional view showing helical lubricant grooves on the radial bearing portion of a bearing of the present invention.
Figure 7:
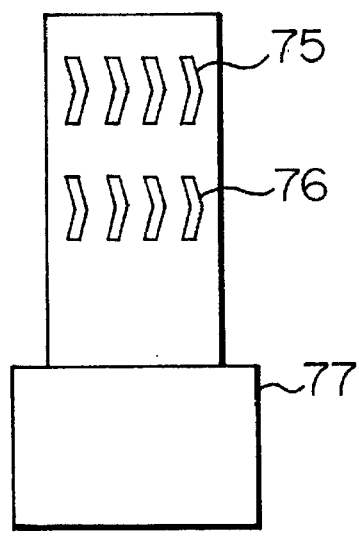
FIG. 7 is a cross-sectional view showing helical lubricant grooves on the radial bearing portion of a shaft of the present invention.

As shown in FIG. 6, in the bush 17, the circular arcs 40–42 in the radial bearing portions 12 and 25 may be replaced by a circular hole with helical grooves 71 and 73. As shown in FIG. 7, a combination of the shaft 17 and the bush 17 with the circular arcs 40–42 for the radial bearing portions 12 and 25 may be replaced by another combination of a shaft 77 with helical grooves 75 and 76 and a bush having the circular hole instead of the circular arcs.

Figure 8:
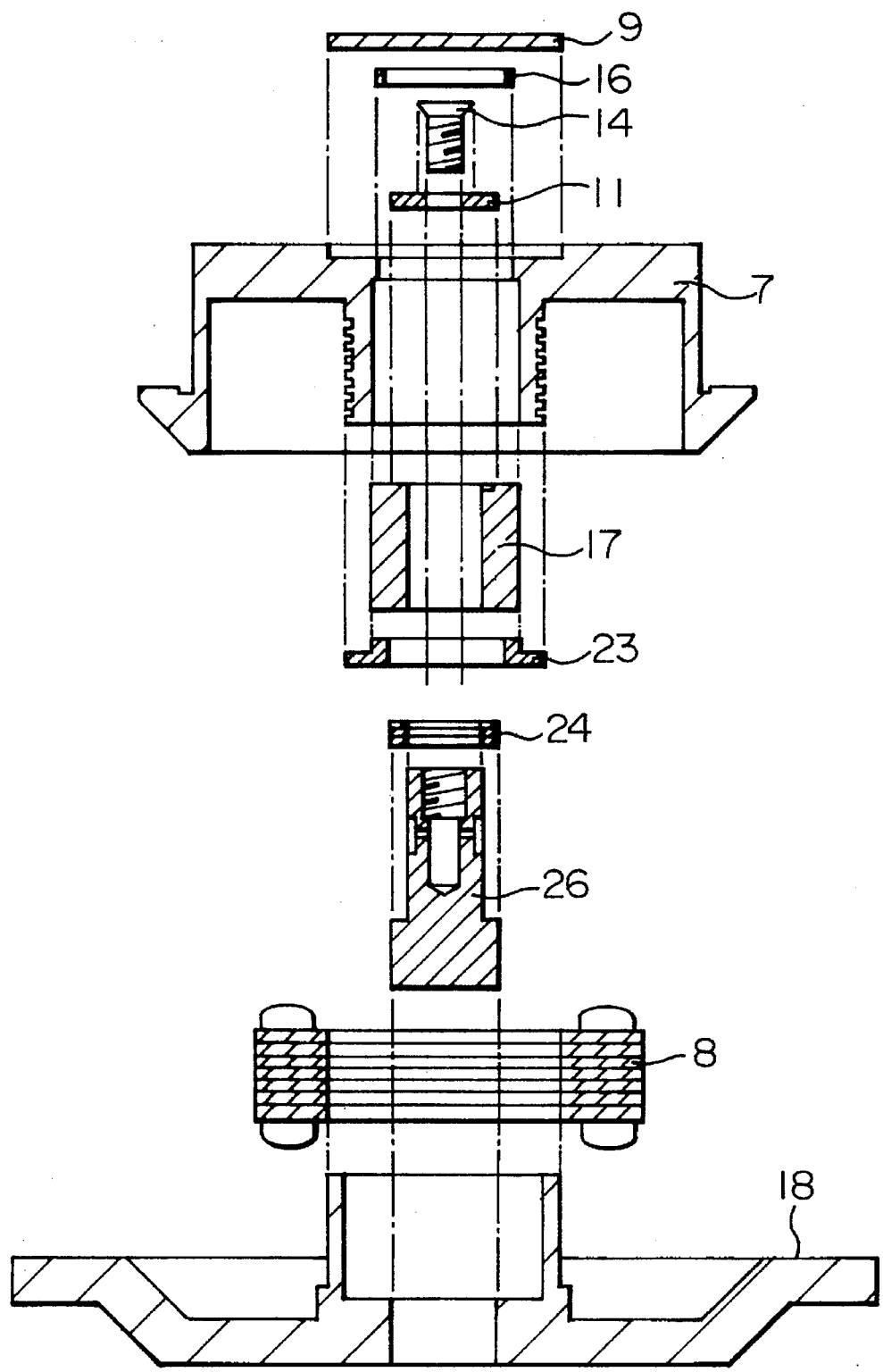
FIG. 8 is a cross-sectional view showing the recording disk apparatus of the present invention before assembling.

In assembling the recording disk rotating apparatus, as shown in FIG. 8, the stator 8 and the shaft 26 onto which the magnet assembly 24 is adhered are fixed to the base 18 with the adhesive as the stationary member. The bush 17 and the magnetically conductive members 23 and 16 are adhered to the hub 7 as the rotary member. The rotary member is mounted onto the stationary member with fitting the bush 17 onto the shaft 26, the magnetic fluid is inserted onto the magnet assembly 24, the lubricant is inserted in the bush 17, and the magnet assembly 11 is fixed onto the shaft 26 by fixing the screw 14 to the shaft 26 with the adhesive while an axial distance between the magnet assemblies 11 and 24 is adjusted suitably relative to the bush 17. Thereafter, the magnetic fluid is inserted onto the magnet assembly 11. If the lubricant is the magnetic fluid lubricant, the magnetic fluid lubricant is inserted to fill the clearance from the magnet assembly 24 to the magnet assembly 11. The cover 9 is finally fixed to the hub 7. The base 18 may be integral to a casing of the recording disk apparatus.

Figure 9:
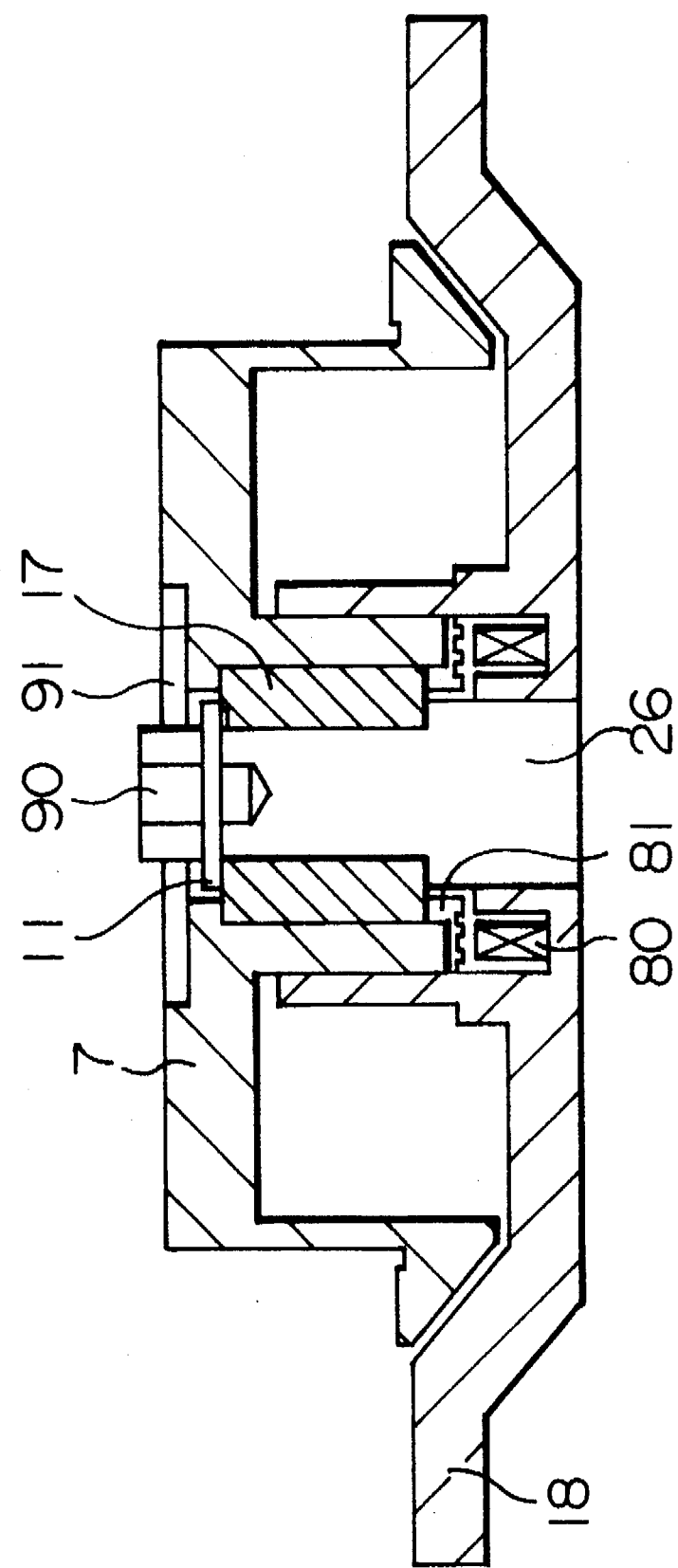
FIG. 9 is a cross-sectional view showing another recording disk apparatus of the present invention.
Figure 10:
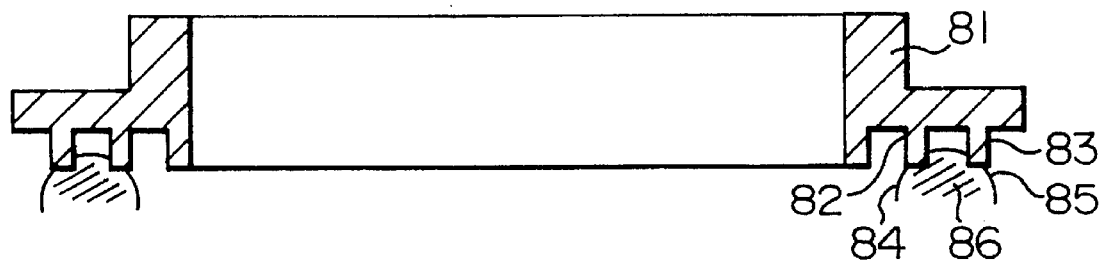
FIG. 10 is a cross-sectional view showing a magnetically conductive yoke used in the recording disk apparatus of FIG. 9.
Figure 11:
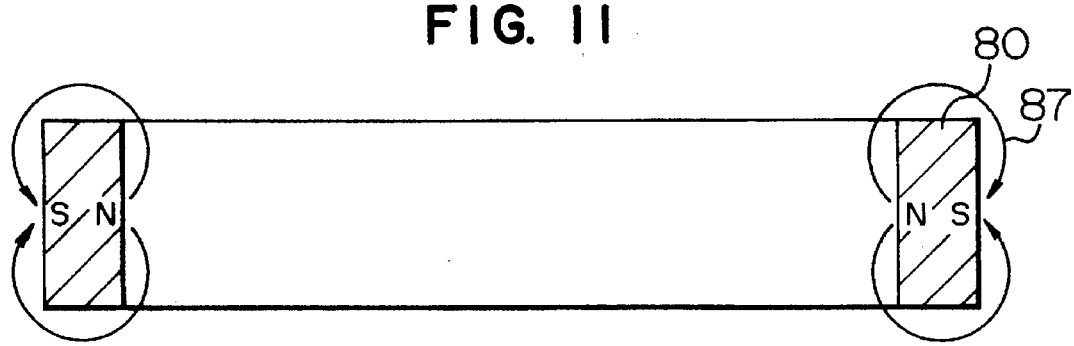
FIG. 11 is a cross-sectional view showing a magnet usable in the recording disk apparatus of FIG. 9.
Figure 12:
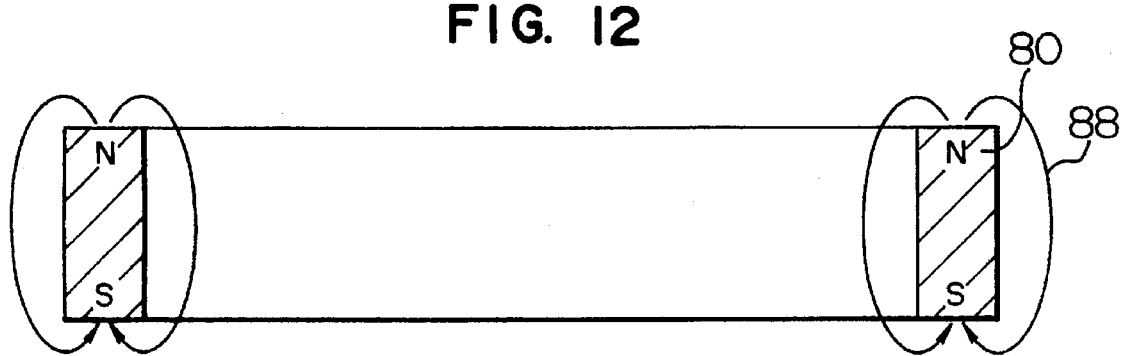
FIG. 12 is a cross-sectional view showing another magnet usable in the recording disk apparatus of FIG. 9.
Figure 13:
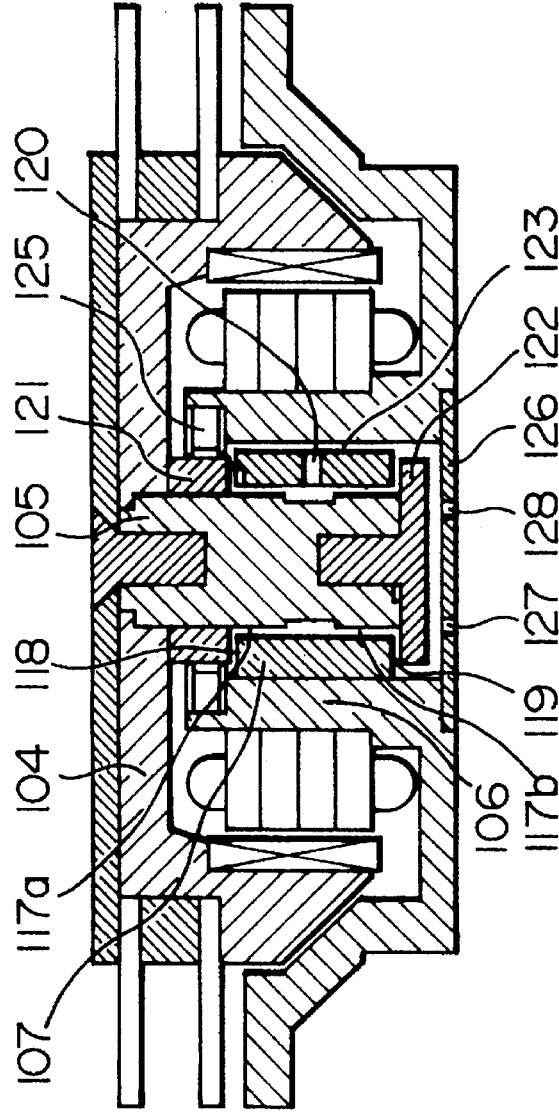
FIG. 13 is a cross-sectional view showing another recording disk rotating apparatus of the present invention incorporated in the recording disk apparatus.
Figure 14:
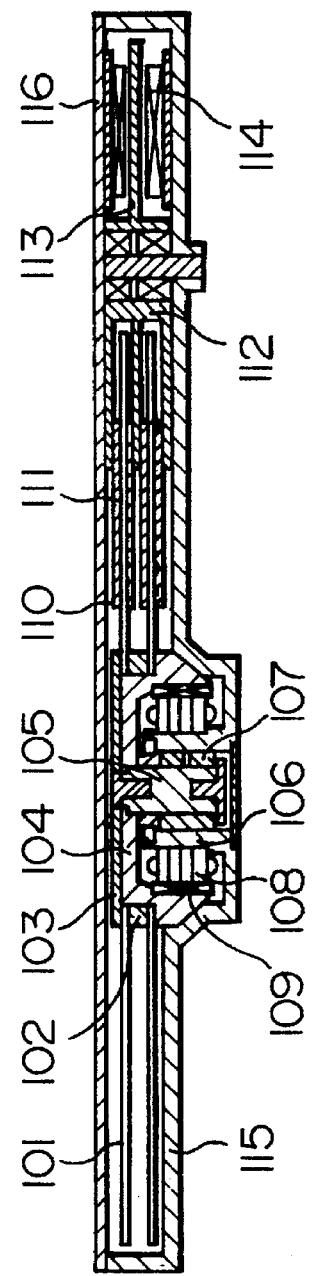
FIG. 14 is a cross-sectional view showing the recording disk apparatus in which the recording disk rotating apparatus of FIG. 13 and a recording head device are incorporated.
Figure 15:
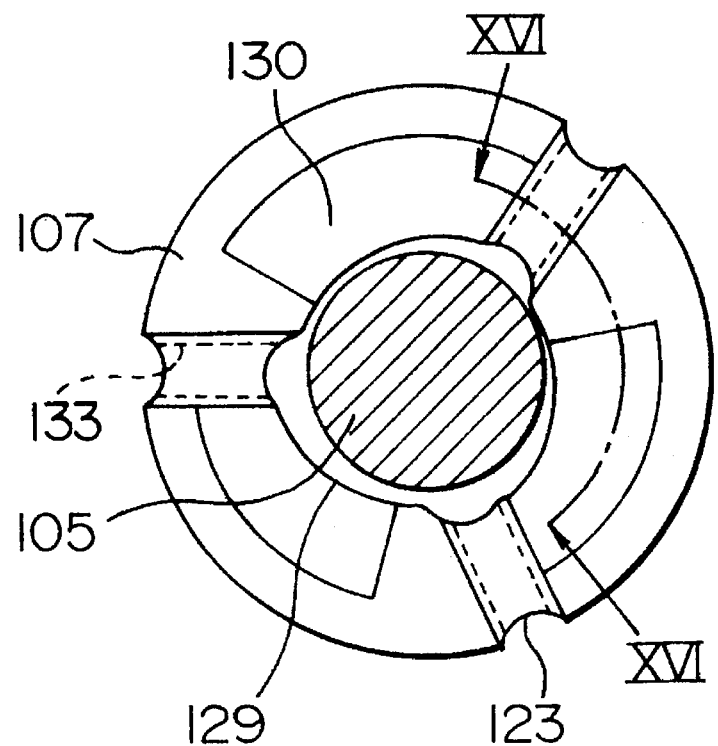
FIG. 15 is a side view of another slide bearing of the present invention with a lubricant circulating path.
Figure 16:
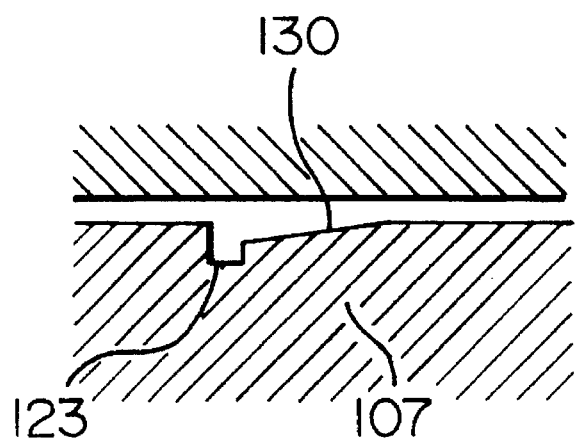
FIG. 16 is a cross-sectional view taken along line 16—16 of FIG. 15 showing the thrust bearing portion tapered in the circumferential direction.
Figure 17:
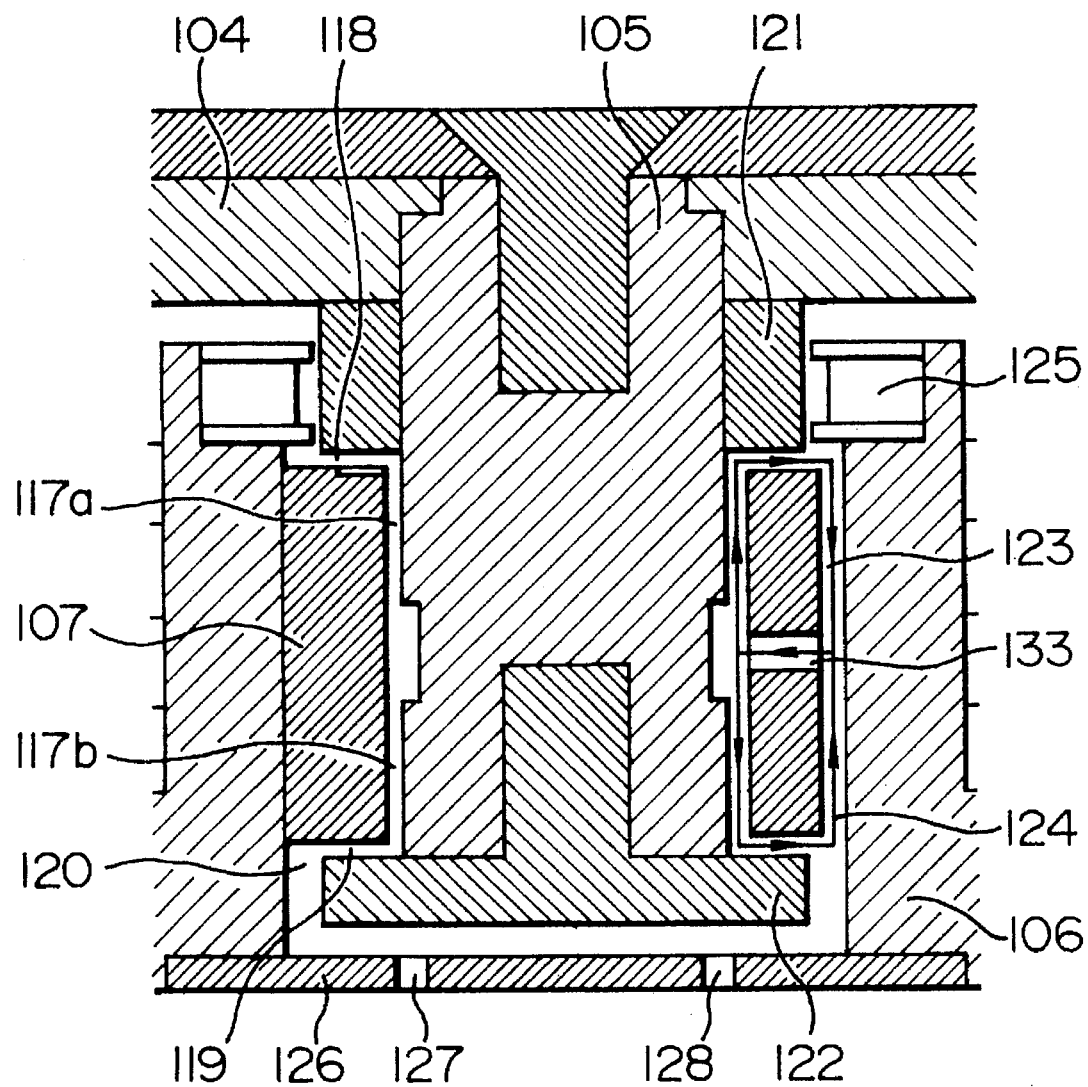
FIG. 17 is a cross-sectional view showing a lubricant circulation through the lubricant circulating path from the thrust bearing portion to the radial bearing portion.

As shown in FIG. 9, a combination of the magnet assembly 24 and the magnetically conductive member 24 may be replaced by a combination of a magnet 80 and a magnetically conductive member 81 in which the magnetic flux for holding the magnetic fluid extends axially, and the screw 14 may be replaced by a screw 90 through which the shaft 25 is fixed to the casing of the recording disk apparatus. A magnetic seal may be formed between the screw 90 and a magnet assembly 91 as the magnet assemblies 11 and 24. As shown in FIG. 10, the magnetically conductive member 81 has projections 82 and 83 to concentrate the magnetic flux 84 and 85 generated by the magnet 80 to hold the magnetic fluid 86. Magnetic flux 87 and 88 of the magnet 80 is shown in FIG. 11 and 12.

In another recording disk rotating device as shown in FIGS. 13–17, recording disks 101 with a spacer 102 therebetween are pressed against a hub 104 by a clamp member 103 to form a rotary member, and a shaft 105 is fixed to the hub 104 to be rotatable in a bush 107 fixed to a housing 106 of the stationary member. A rotational torque is generated between a stator 108 with electro-magnetical coils around iron cores in the housing 106 and permanent magnets 109 in the hub 107 to rotate the rotary member. Each of the recording disks 101 is arranged between recording heads 110 to record signals thereonto and/or to read out them therefrom. Each of the recording heads 110 is connected to a carriage 112 through an arm 111, and the carriage 112 is swingable on a center axis to change a radial position of the recording heads 110 on the recording disks 101. The carriage 112 is driven rotationally by a combination of VCM coil 113 and VCM magnet 114. These members on a base 115 are covered by a cover 16.

Radial bearing portions 117a and 117b formed by circular arcs 129 as the before-mentioned wedge shaped or tapered clearances are formed between the bush 107 and the shaft 105, and the clearances are filled with a magnetic fluid lubricant 120. Thrust bearing portions 118 and 119 formed by tapered grooves 130 as the before-mentioned wedge shaped or tapered clearances are formed between the bush 107 and a thrust plate 122 fixed to the shaft 105 and between the bush 107 and a magnetically conductive thrust member 121 on the shaft 105, and the clearances are filled with the magnetic fluid lubricant 120 until the magnetic fluid lubricant 120 reaches a magnetic fluid seal device combination of a magnet assembly 125 and the magnetically conductive thrust member 121.

Grooves 123 extending radially and axially operate as the claimed lubricant communication groove and the claimed lubricant circulating path, and holes 133 extend between the groove 123 and the radial bearing portions 117a and 117b, so that a lubricant circulation 124 for cooling the lubricant and preventing a large temperature variation over the whole of the bush 107 is formed. When a relative rotation between the bush 107 and the shaft 105 occurs, the lubricant communicating with the radial bearing portions 117a and 117b through the grooves 123 is introduced into the thrust bearing portions 118 and 119, flows radially outward out of the thrust bearing portions 118 and 119 by a centrifugal force, flows in the circumferential direction by a lubricant viscosity, reaches the grooves 123, and the lubricant accelerated as described above flows in the grooves 123 through the holes 133 to the radial bearing portions 117a and 117b, so that the lubricant circulation 124 is performed.

In order to remove the air completely from the magnetic fluid seal device, the slide bearing and a clearance therebetween, a cap 126 has both a magnetic fluid lubricant inserting hole 127 and an air discharge hole 128. After fixing the cap to the housing 106 and filling fully an inside of the cap 126 with the magnetic fluid lubricant until reaching the cap 126, the holes 127 and 128 are closed by the adhesive.

Figure 18:
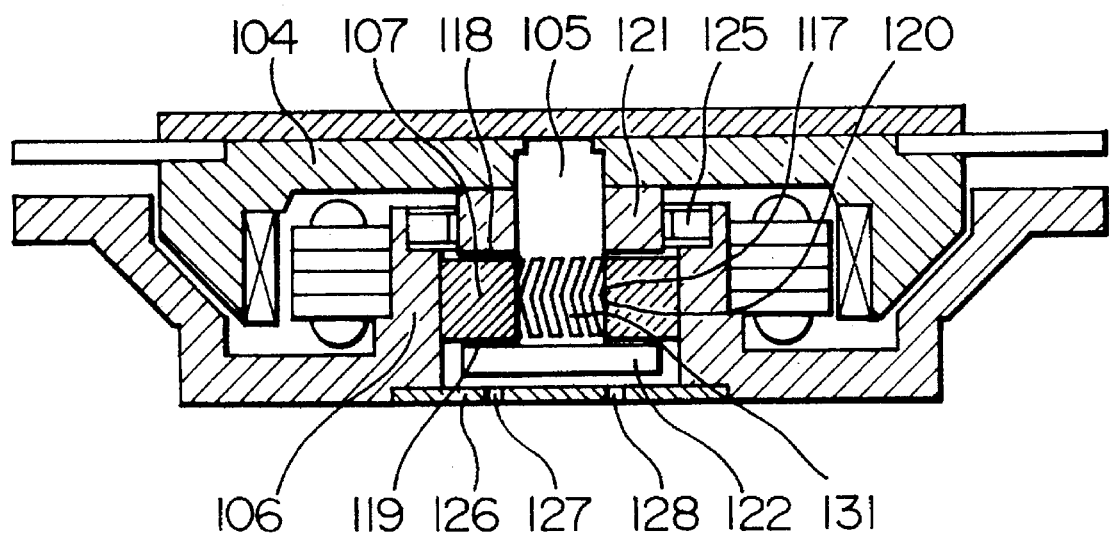
FIG. 18 is a cross-sectional view showing another recording disk rotating apparatus incorporated in the recording disk apparatus.
Figure 19:
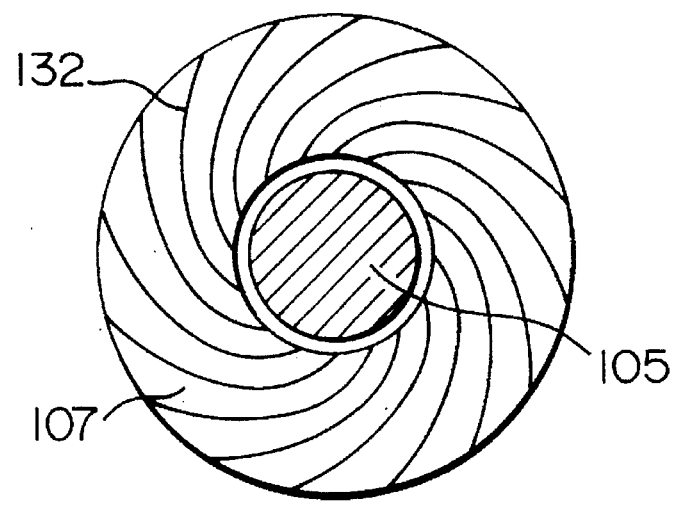
FIG. 19 is a side view showing the thrust bearing portion.

As shown in FIG. 18, the circular arcs of the radial bearing portions may be replaced by a combination of a circular hole of the bush and helical or herringbone grooves 131 thereon, or a combination of the circular hole of the bush and the helical or herringbone grooves 131 on the shaft. As shown in FIG. 19, the tapered clearances of the thrust bearing portions may be replaced by a combination of a flat axial end surface of the bush and spiral grooves 132 on the shaft, or a combination of a non-groove shaft and the spiral grooves 132 on the axial end surface of the bush.

Figure 20:
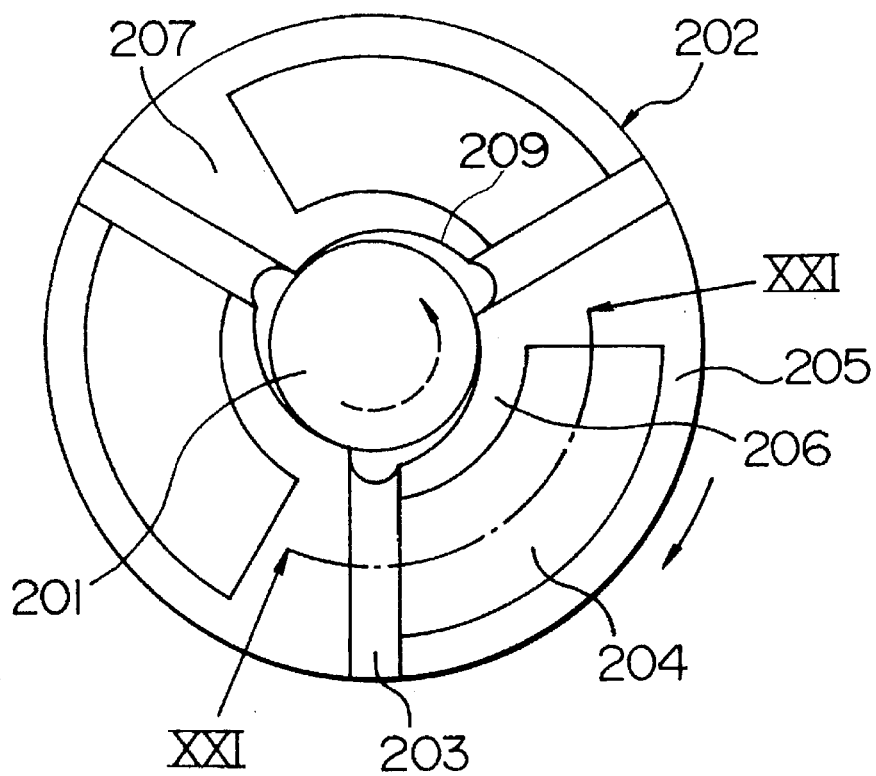
FIG. 20 is a side view of another slide bearing of the present invention showing radially outer and inner end surfaces or lands for the thrust bearing portion.
Figure 21:
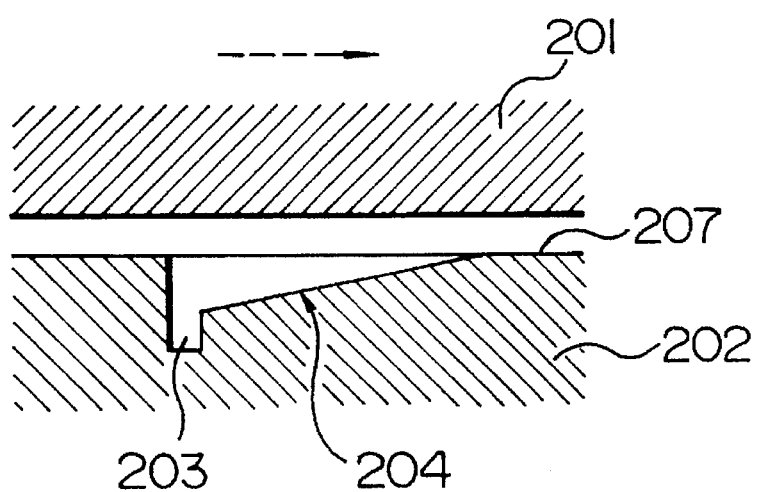
FIG. 21 is a cross-sectional view taken along line 21—21 of FIG. 20.
Figure 22:
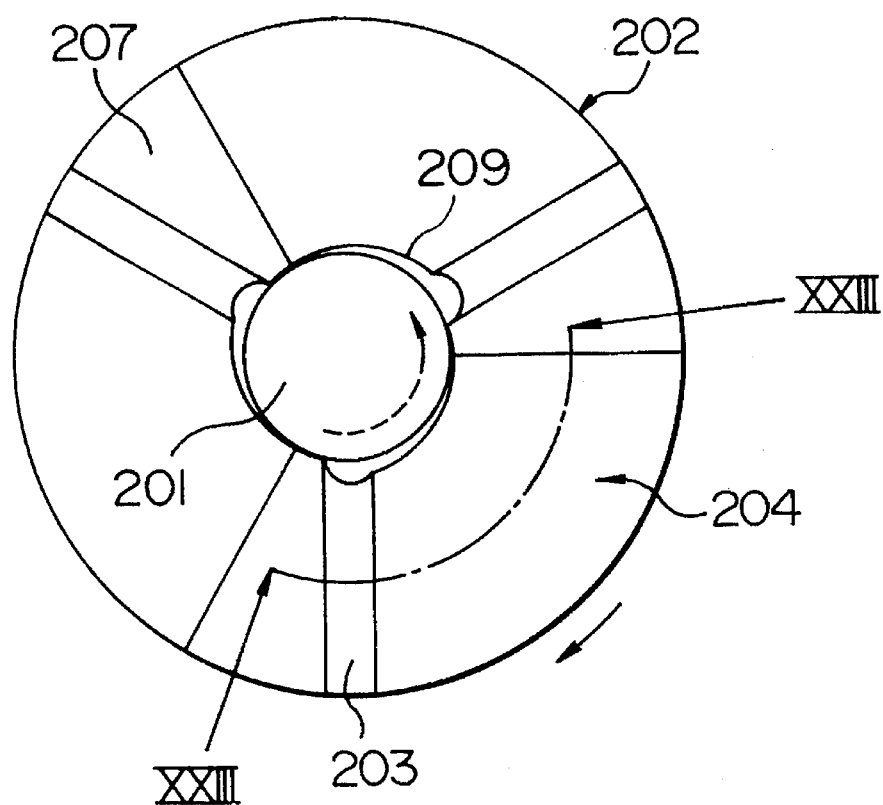
FIG. 22 is a side view of another slide bearing of the present invention without both the radially outer and inner end surfaces or lands for the thrust bearing portion.
Figure 23:
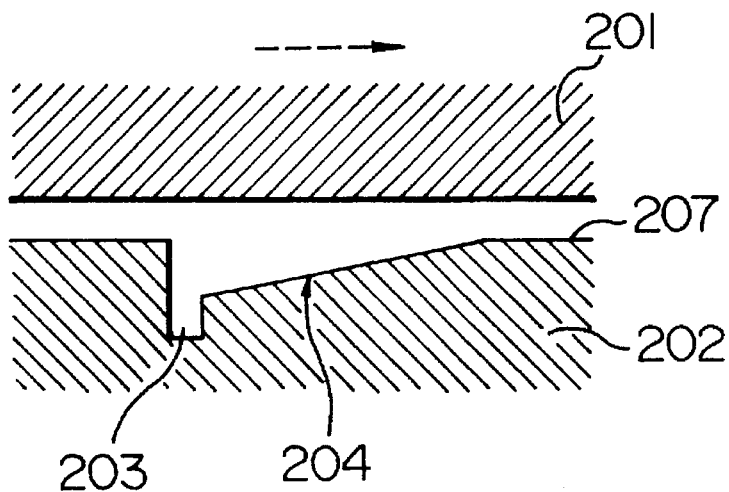
FIG. 23 is a cross-sectional view taken along line 23—23 of FIG. 22.
Figure 24:
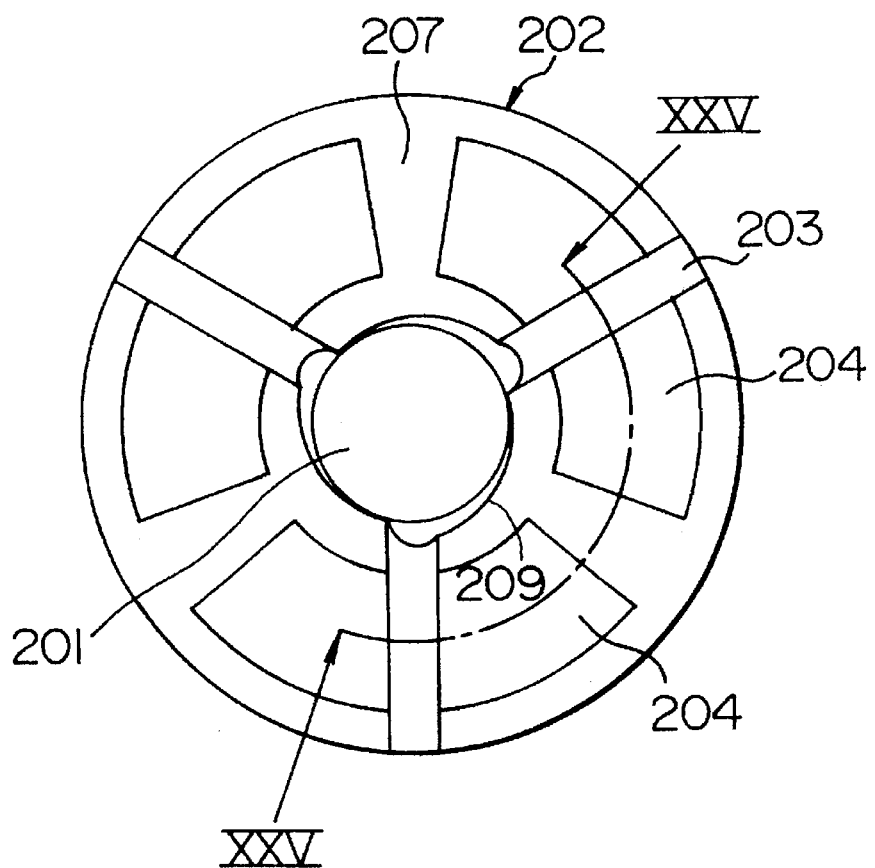
FIG. 24 is a side view of another slide bearing of the present invention with the thrust bearing portions in both circumferential directions from the lubrication communication groove.
Figure 25:
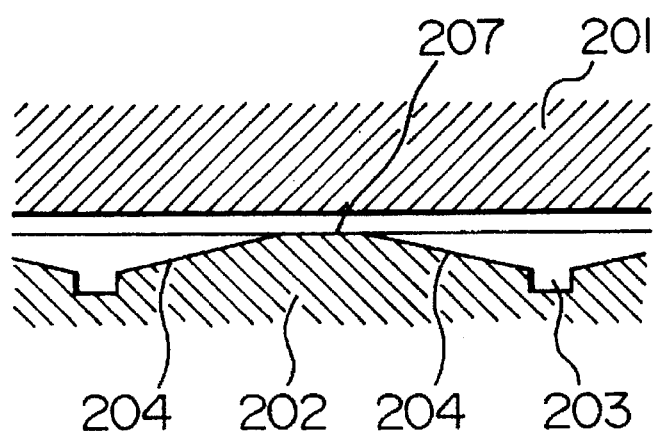
FIG. 25 is a cross-sectional view taken along line 25—25 of FIG. 24.
Figure 26:
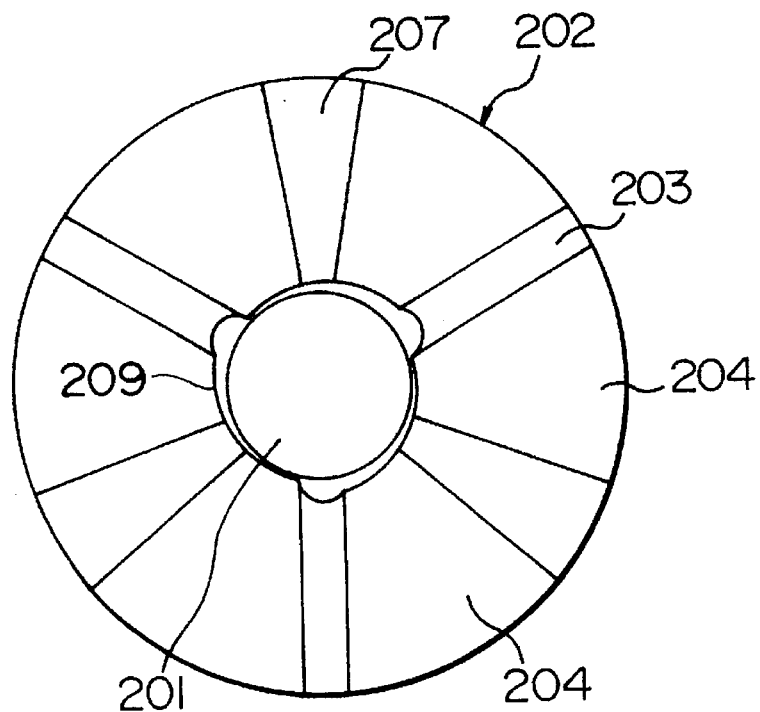
FIG. 26 is a side view of another slide bearing of the present invention with the thrust bearing portions in both circumferential directions from the lubrication communication groove and without both the radially outer and inner end surfaces or lands.
Figure 27:
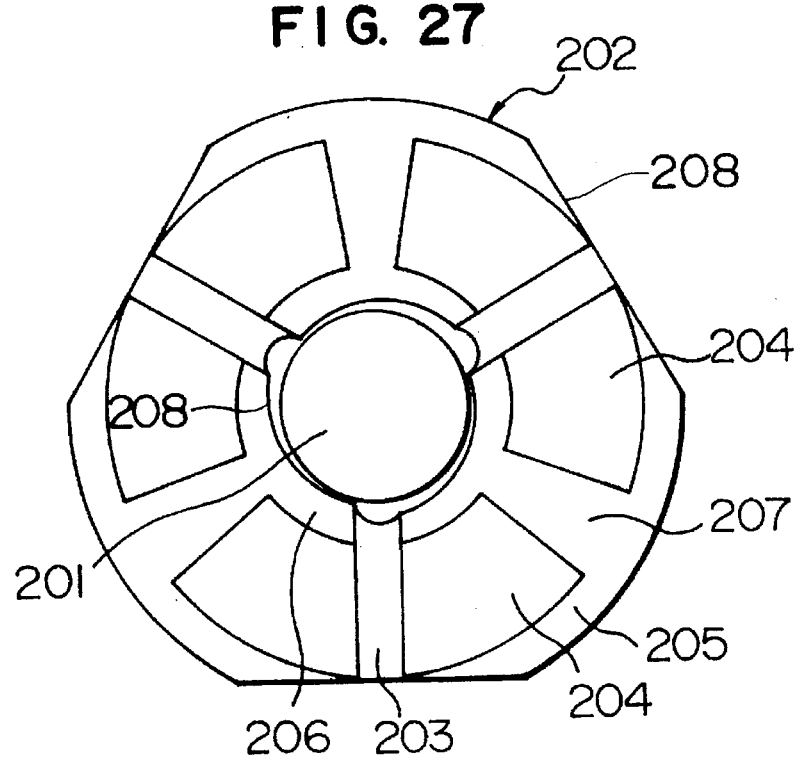
FIG. 27 is a side view of another slide bearing of the present invention with chamfers for angularly positioning of the slide bearing.
Figure 28:
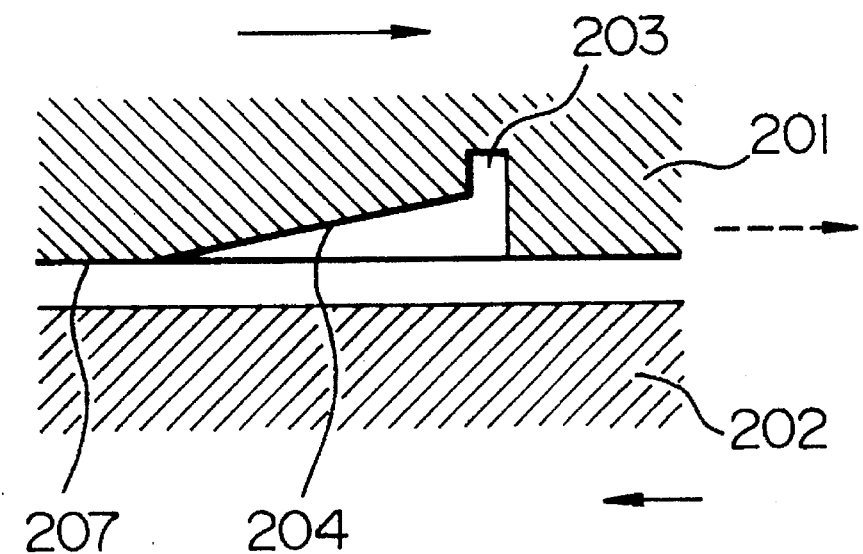
FIG. 28 is a cross-sectional view showing the thrust bearing portion and the lubricant communication groove formed on the shaft of the present invention.
Figure 29:
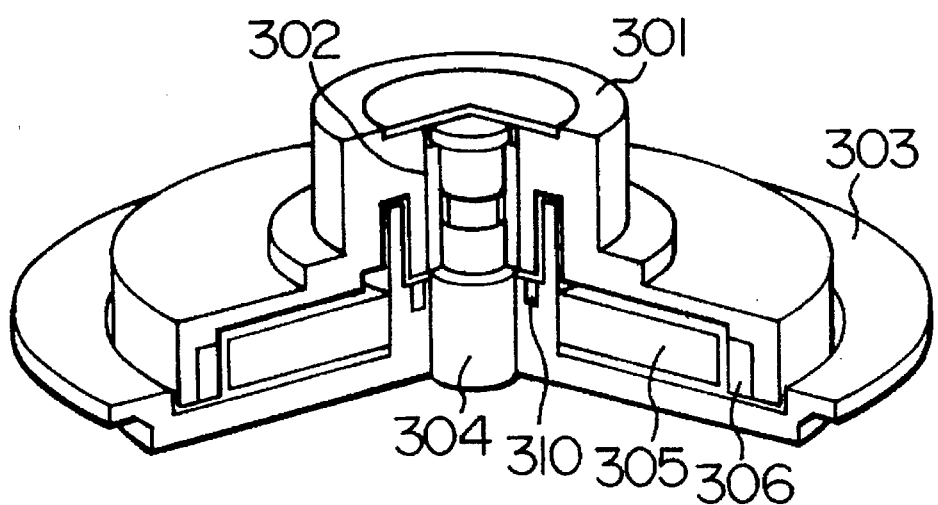
FIG. 29 is a partially-cross-sectional oblique-projection view of another recording disk apparatus of the present invention.
Figure 30:
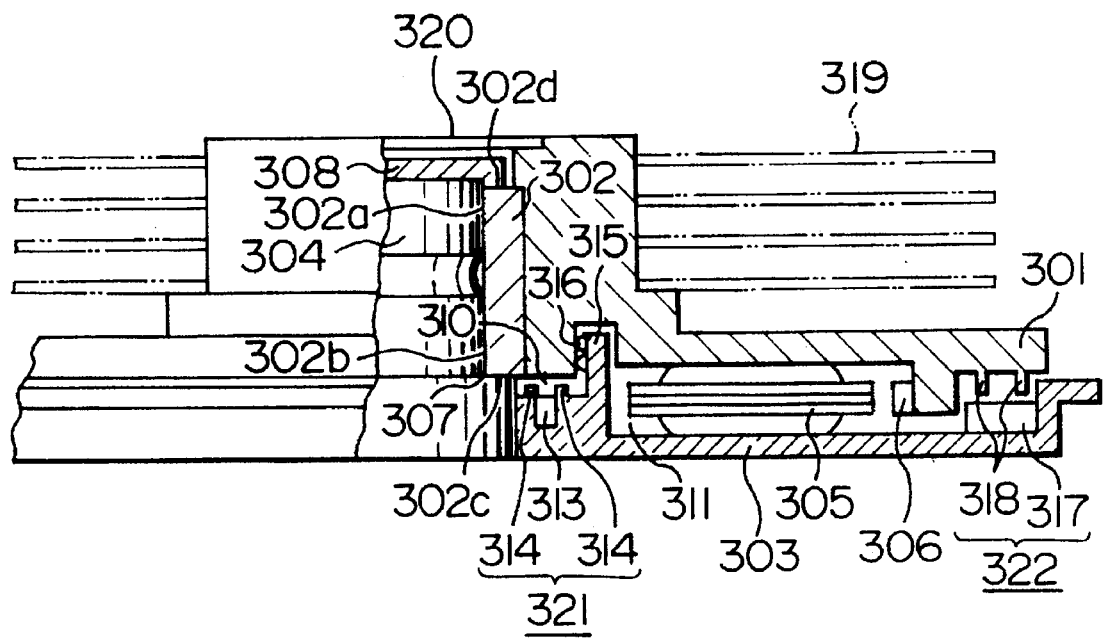
FIG. 30 is a partially-cross-sectional view of the recording disk apparatus of FIG. 29.
Figure 31:
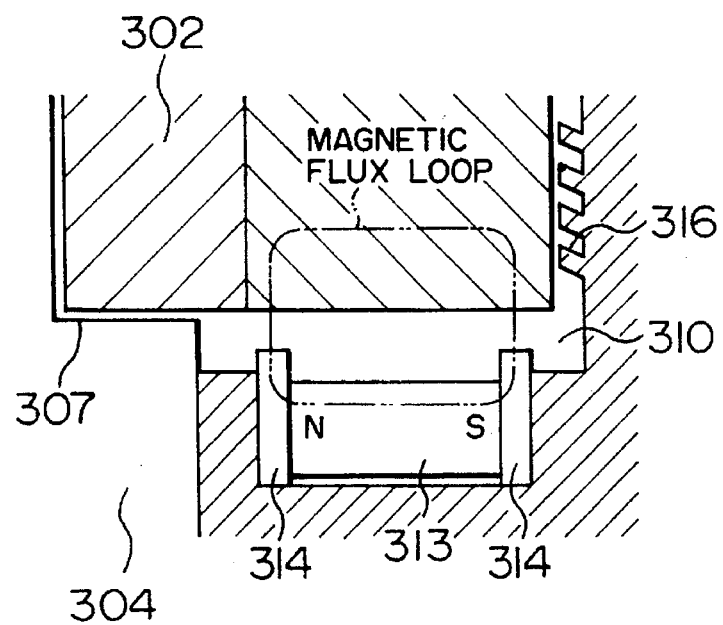
FIG. 31 is a cross-sectional view showing a magnetic fluid seal device.
Figure 32:
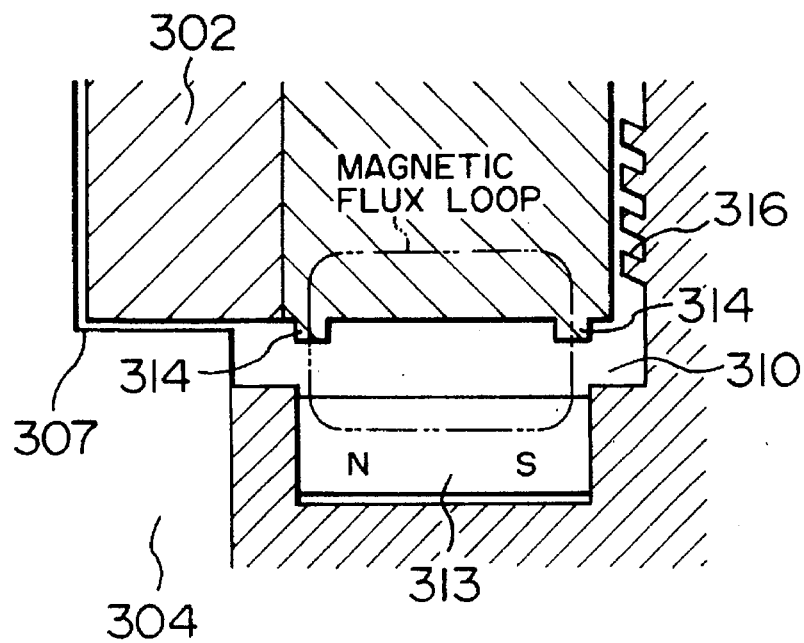
FIG. 32 is a cross-sectional view showing another magnetic fluid seal device.

The bushes 17 and 107 may be replaced by a bush 202 as shown in FIGS. 20–27. The bush 202 includes circular arcs 209 for a shaft 201, thrust grooves 204 tapered in the circumferential direction, lubricant communication grooves 203, and end surfaces or lands 207 to face close axially to the shaft between the thrust grooves 204 and the lubricant communication grooves 203. The bush 202 may include radially outer end surfaces or lands 205 to face close axially to the shaft at a radially outer side of the thrust grooves 204, and radially inner end surfaces or lands 206 to face close axially to the shaft at a radially inner side of the thrust grooves 204, as shown in FIG. 20. The radially inner and outer end surfaces or lands 206 and 205 may be deleted from the bush 207, as shown in FIG. 22. The thrust grooves 204 may extend both circumferential directions from the lubricant communication grooves 203, as shown in FIGS. 24–26. The bush 202 may have chamfers 208 as datum planes for positioning correctly the thrust grooves 204, the circular arcs 209 and the lubricant communication grooves 203. The thrust grooves 204, the lubricant communication grooves 203, the end surfaces or lands 207 and so forth may be formed on the shaft 201, when the bush 20 has a circular hole for the shaft 201 and/or a non-groove or flat thrust end surface, as shown in FIG. 28.

Figure 43:
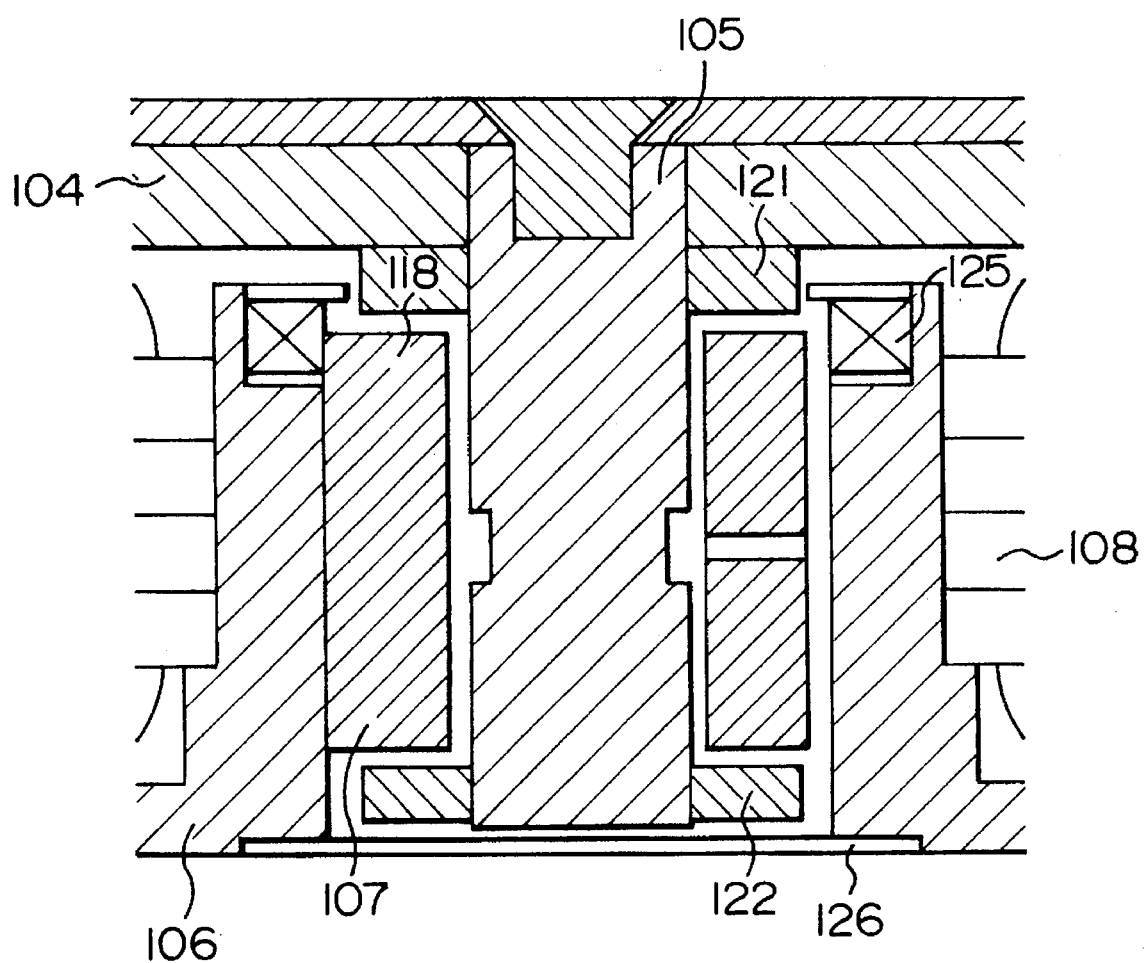
FIG. 43 is a partial cross-sectional view showing another recording disk rotating apparatus of the present invention incorporated in the recording disk apparatus.

As shown in FIG. 43, the magnet assembly 125 may surround the bush 107 of magnetic conductivity or be arranged within an axial width thereof so that the magnetic flux generated by the magnet assembly 125 passes radially the bush to be transmitted therethrough to the shaft 105 of magnetic conductivity and to the magnetically conductive thrust member 121. The magnetic fluid lubricant is securely held between the magnet assembly 125 and the magnetically conductive thrust member 121 to prevent a lubricant leakage.

In another recording disk rotating apparatus as shown in FIGS. 29–33, a hub 301 for holding recording disks 319 is supported in a rotatable manner on a base plate 303 as the stationary member by a slide bearing unit composed of a shaft 304 incorporated with the base plate 303 and a bearing 302 incorporated with the hub 301. The slide bearing unit has radial bearing portions 302a and 302b and thrust bearing portions 302c and 302d. A motor chamber 311 is formed between the hub 301 and the base plate 303 to receive therein a motor stator 305 fixed to the base plate 303 and rotor permanent magnets 306 fixed to the hub 301. The motor stator 305 with electro-magnets face radially to the rotor permanent magnets 306 to generate a torque therebetween for rotating the hub 301.

Figure 33:
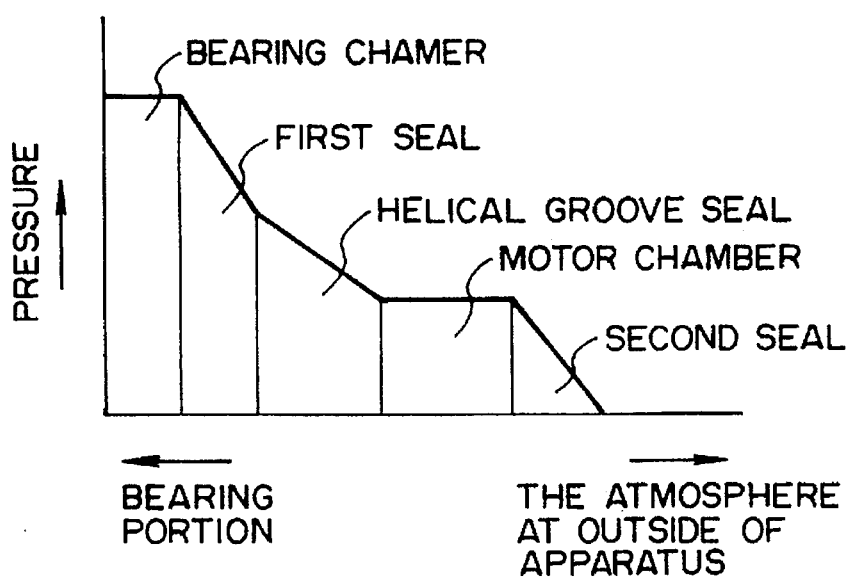
FIG. 33 is a diagram showing a pressure distribution between the bearing portion and the outside of the apparatus of FIGS. 29 and 30.

The thrust bearing portion 302c is formed between a shoulder 307 of the shaft 304 and the bearing 302, and the thrust bearing portion 302d is formed between a thrust plate 308 fixed to an end of the shaft 304 and the bearing 302. A magnetic fluid seal chamber 310 communicating fluidally with the radial bearing portions 302a and 302b and thrust bearing portions 302c and 302d is substantially filled with a magnetic fluid lubricant 312 and is hermetically sealed by a magnetic fluid seal device 321 and a seal cap 320. A magnetic flux generated by an annular magnet 313 incorporated with the base plate 303 and polarized radially extends axially between at least two annular projections 314 and the hub 301 in the chamber 310 to form the magnetic fluid seal device 321 between the slide bearing unit and the motor chamber 311. The annular projections 314 may be incorporated within the hub 301. Another magnetic flux generated by another annular magnet 317 incorporated with the base plate 303 and polarized radially extends axially between at least two annular projections 318 of the hub 301 and the magnet 317 to hold the magnetic fluid therebetween so that another magnetic fluid seal device 322 is formed between the atmosphere of an outside of the recording disk rotating apparatus and the motor chamber 311. A helical or screw groove 316 is arranged on a sleeve portion 315 of the base plate 303 to face close to a periphery of the hub 301 between the motor chamber 311 and the magnetic fluid seal device 321 so that the air therebetween is urged and guided toward the magnetic fluid seal device 321 according to a rotation of the hub 301 to prevent the magnetic fluid lubricant from flowing out of the magnetic fluid seal device 321. Since a plurality of the magnetic fluid seal devices 321 and 322 and the screw groove 316 are arranged between the slide bearing unit and the air of the outside of the recording disk rotating apparatus, a difference in pressure across each of the magnetic fluid seal devices 321 and 322 is kept small as shown in FIG. 33, even when the lubricant is heated to expand by an air disturbing loss by a rotation of the recording disks 319, a circumferential temperature of the recording disk rotating apparatus, a frictional loss of the slide bearing unit and/or an electro-magnet coil iron loss of the motor stator 305. Therefore, the lubricant leakage is securely prevented. The magnetic fluid seal device 321 is not arranged on the shaft 304 so that a fitting area between the shaft 304 and the base plate 302 is increased.

Figure 34:
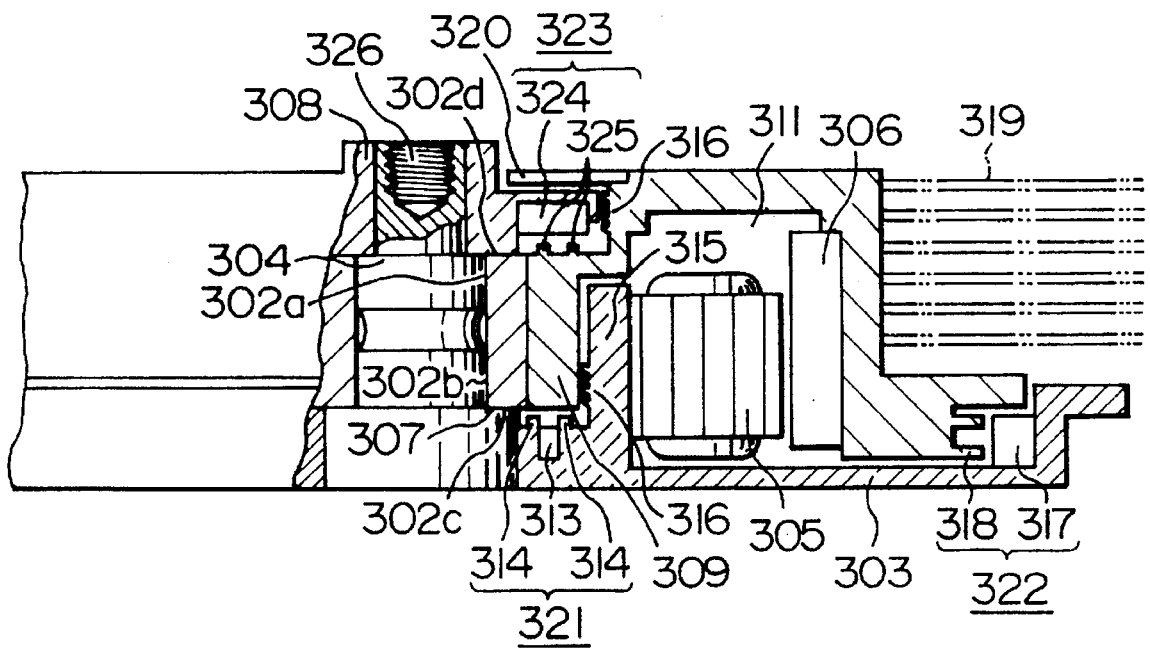
FIG. 34 is a partially-cross-sectional view of another recording disk apparatus of the present invention.
Figure 35:
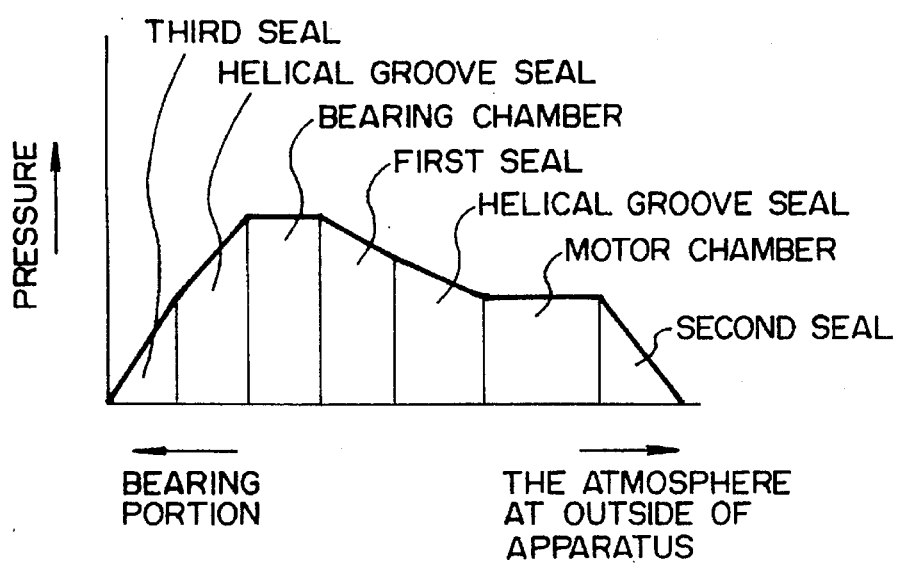
FIG. 35 is a diagram showing a pressure distribution through the apparatus of FIG. 34.

As shown in FIG. 34, another magnetic fluid seal device 323 may be arranged between at least two projections of the hub 301 and a magnet 324 fixed to the thrust plate 308, and the thrust plate 308 may be fixed to the housing of the recording disk apparatus through a screw hole 326. In this embodiment, a difference in pressure across each of the magnetic fluid seal devices 321, 322 and 323 is also kept small as shown in FIG. 35.

Figure 36:
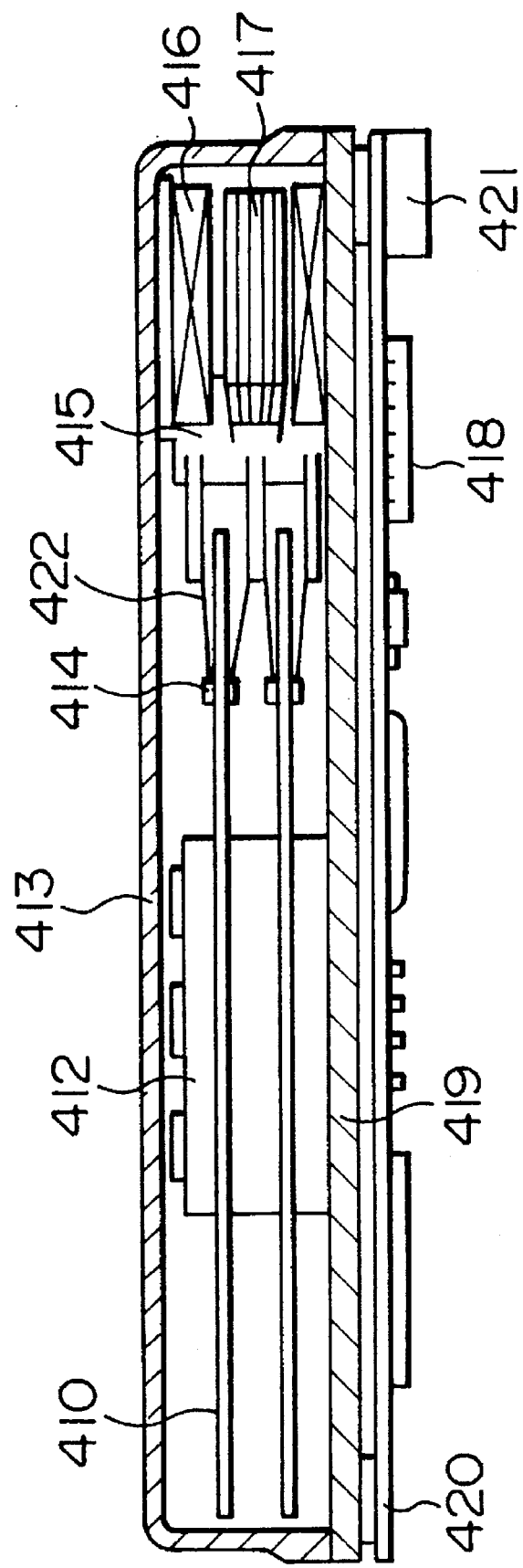
FIG. 36 is a cross-sectional view showing another recording disk apparatus in which another recording disk rotating apparatus and the recording head device are incorporated.
Figure 37:
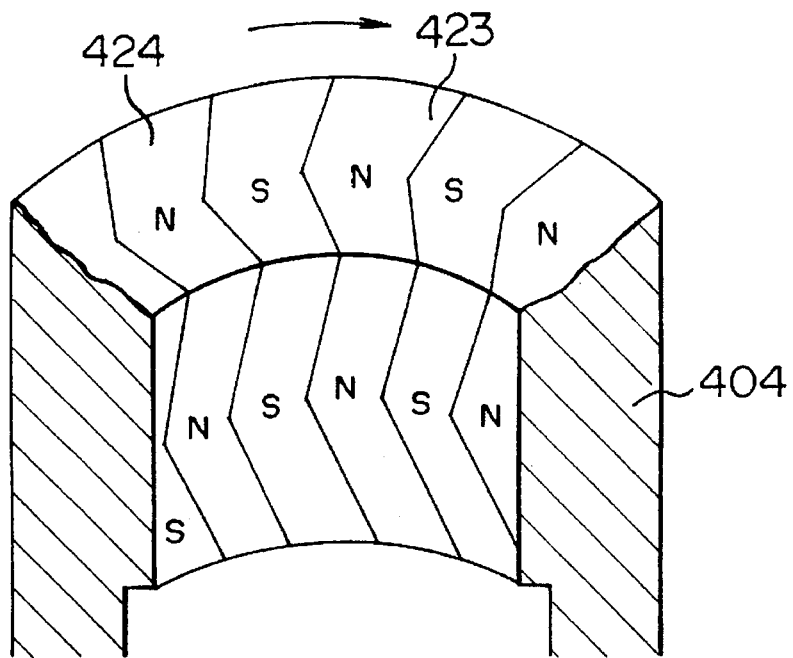
FIG. 37 is a partial cross-sectional view showing another radial bearing of the present invention for another radial slide bearing to be incorporated in the recording disk apparatus.

In another recording disk rotating device as shown in FIG. 36, recording disks 410 are fixed to a hub 412 to form a rotary member, and the hub 412 is rotated on a housing 419 of the stationary member. Each of the recording disks 410 is arranged between recording heads 414 to record signals thereonto and/or to read out them therefrom. Each of the recording heads 414 is connected to a carriage 415 through an arm 422, and the carriage 415 is swingable on a center axis to change a radial position of the recording heads 414 on the recording disks 410. The carriage 415 is driven rotationally by a combination of VCM coil 417 and VCM magnet 416. These members are covered by a cover 413 on which an electric circuit substrate 420 is arranged. A signal processing and VCM coil driver IC 418 is electrically connected to the recording heads 414 and the VCM coil 417 through a connector 412.

Figure 38:
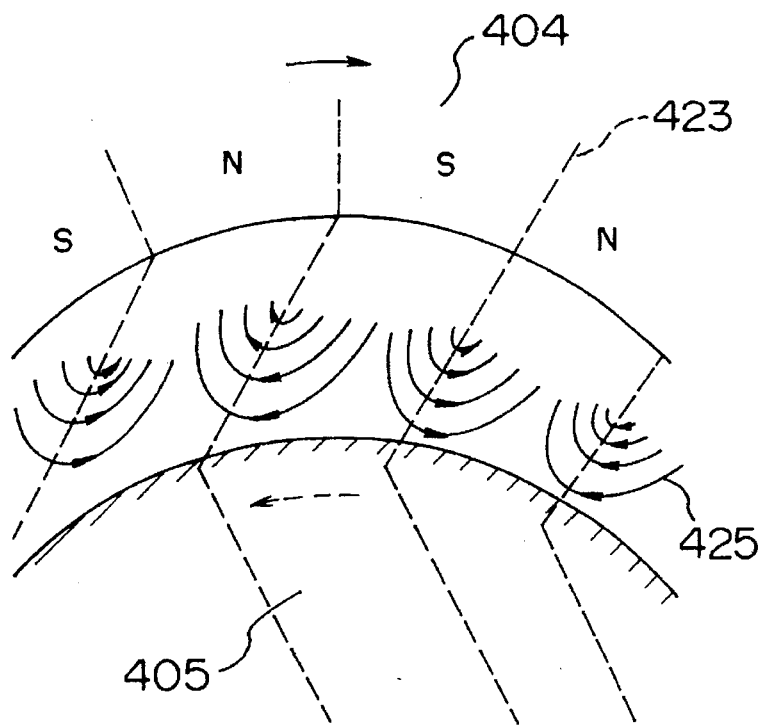
FIG. 38 is an oblique projection brief view showing a combination of the another bearing of FIG. 37 and a non-magnetically-conductive shaft.

A slide bearing unit for supporting the hub 412 in a rotatable manner has a non-magnetically conductive shaft 405 and a magnet bearing 404 in which boundaries 423 of N-poles and S-poles of permanent magnets 424 are bent to form apexes as shown in FIG. 38. The magnetic fluid lubricant guided or held by a magnetic force 425 of the permanent magnets 424 along the boundaries 423 is urged toward the apexes when a relative rotation between the shaft 405 and the bearing 404 occurs in directions indicated by the dot line arrow and the solid line arrow, so that a pressure of the magnetic fluid lubricant is significantly increased at the apexes.

Figure 39:
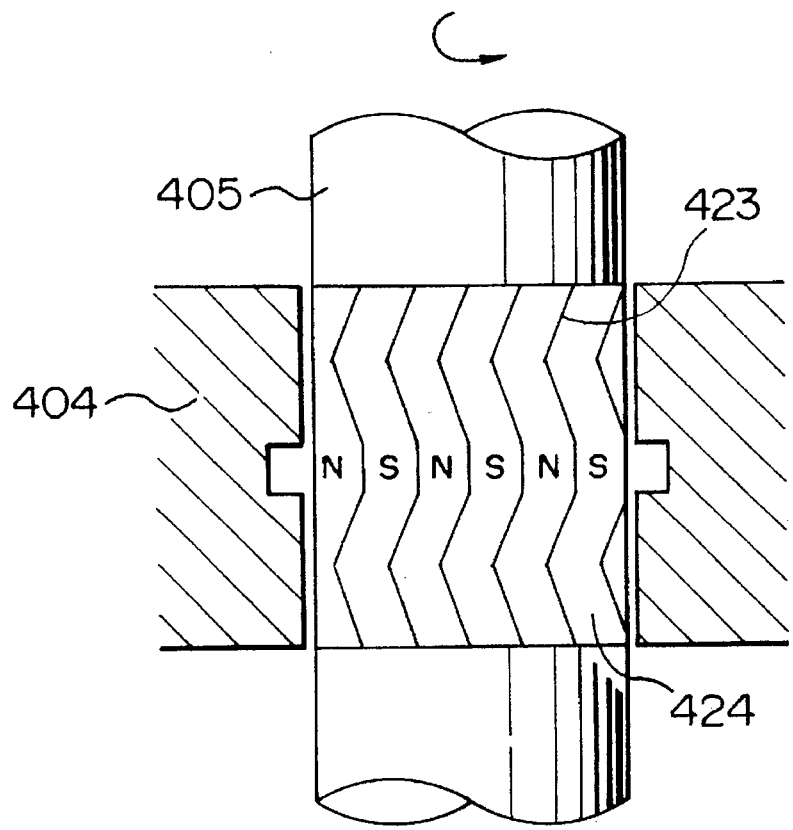
FIG. 39 is a cross-sectional view showing a combination of another shaft of the present invention and a non-magnetically-conductive bearing for another radial slide bearing to be incorporated in the recording disk apparatus.
Figure 40:
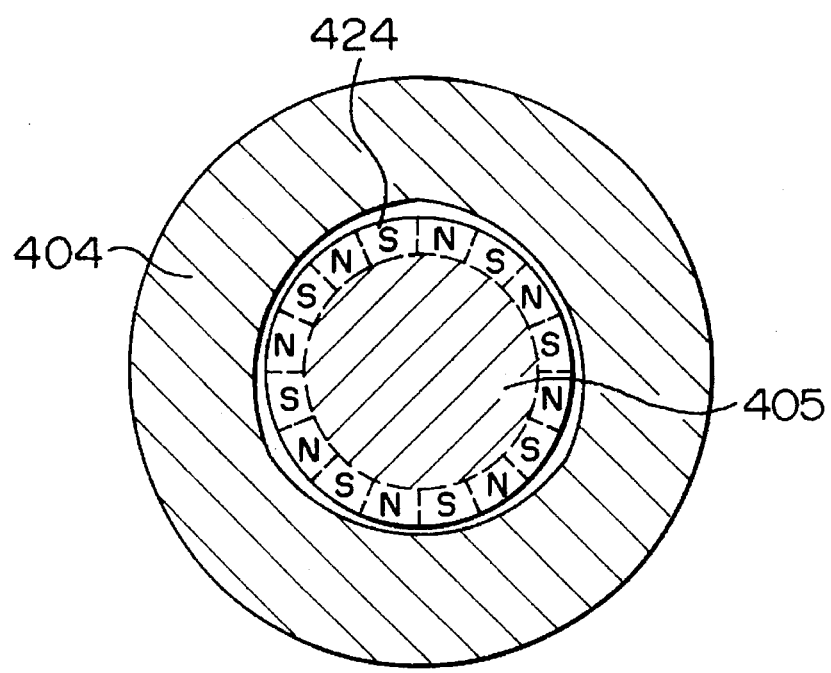
FIG. 40 is a cross-sectional view showing the shaft of FIG. 39 and the non-magnetically-conductive bearing.

Another slide bearing unit for supporting the hub 412 in a rotatable manner has the bearing 404 of non-magnetical conductivity and the magnet shaft 405 in which the boundaries 423 of N-poles and S-poles of permanent magnets 424 are bent to form the apexes as shown in FIG. 39. In this embodiment, a hole in which the magnetic shaft 405 is supported may be composed of at least three circular arcs whose curvature centers are not arranged on the axis of the magnet shaft 405 as shown in FIG. 40, so that the pressure of the magnetic fluid lubricant is further increased.

Figure 41:
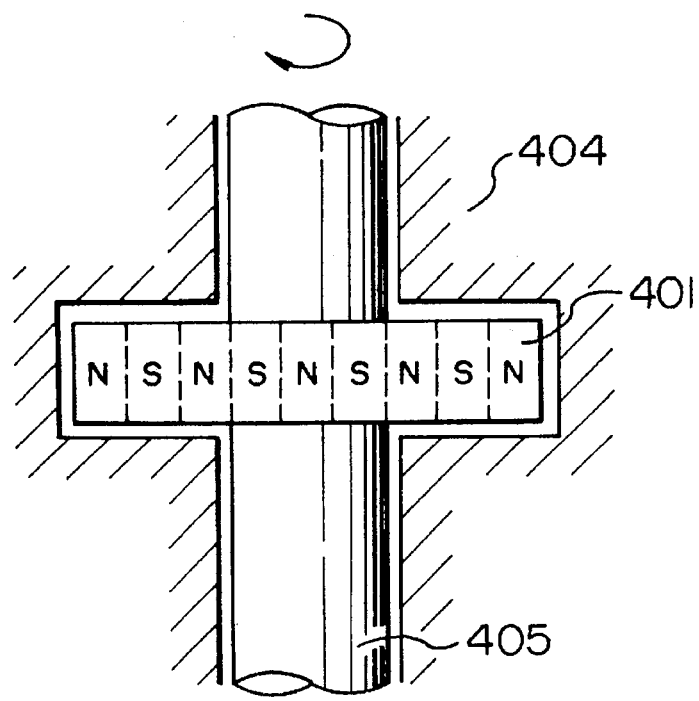
FIG. 41 is a cross-sectional view showing a combination of another shaft of the present invention and a non-magnetically-conductive bearing for another thrust slide bearing to be incorporated in the recording disk apparatus.
Figure 42:
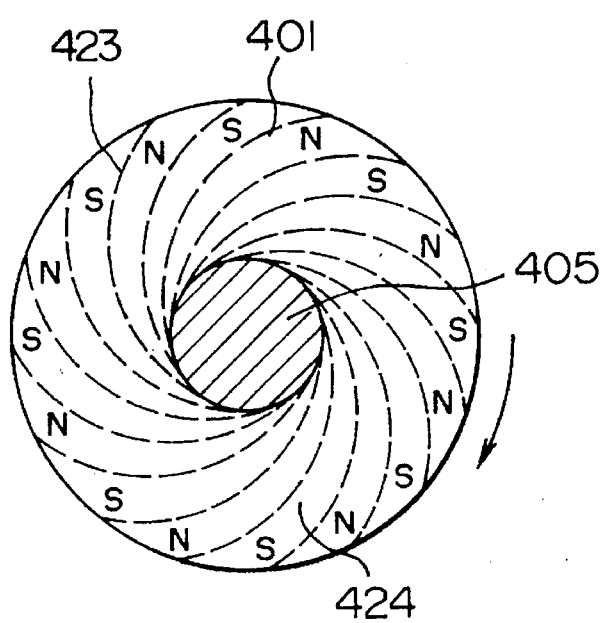
FIG. 42 is a cross-sectional view showing the shaft of FIG. 41.

The thrust bearing portion may be formed as shown in FIGS. 41 and 42. The magnetic fluid lubricant guided or held by the permanent magnets 424 along the boundaries 423 on a thrust plate 401 is urged radially inward when the shaft is rotated as shown by an solid line arrow on the bearing 404 of non-magnetical conductivity. In the embodiments of FIGS. 37–41, the magnetic fluid lubricant is held securely around the slide bearing unit.

What is claimed is:

1. A recording disk apparatus comprising:
   at least one disk for recording a signal thereon,
   a rotary member on which said at least one disk is mounted,
   a rotational supporting device including a shaft and a bearing, one of the shaft and bearing being incorporated with the rotary member and being rotatable relative to the other of the shaft and bearing on an axis, and
   a lubricant in the rotational supporting device, wherein the bearing has a thrust bearing portion for generating a thrust dynamic lubricant pressure between the shaft and bearing in a thrust direction substantially parallel to the axis according to the rotation of the rotary member, and a radial bearing portion for generating a radial dynamic lubricant pressure between the shaft and bearing in a radial direction substantially perpendicular to the axis according to a rotation of the rotary member, and a first clearance between the shaft and the thrust bearing portion is tapered in a circumferential direction so that the thrust dynamic lubricant pressure is increased in the first clearance as a result of the rotation of the rotary member, wherein a position of a terminating end of the first clearance at which an axial distance between the thrust bearing portion and the shaft is substantially smallest in the thrust bearing portion, is circumferentially aligned to a circumferential position of a second clearance at which a radial distance between the radial bearing portion and the shaft is substantially smallest in the radial bearing portion.

2. A recording disk apparatus according to claim 1, wherein the bearing further has an end surface which surrounds the thrust bearing portion in the circumferential direction at a radially outer side of the thrust bearing portion to throttle a radial flow of the lubricant from the thrust bearing portion.

3. A recording disk apparatus according to claim 1, wherein the second clearance between the shaft and the radial bearing portion is tapered in the circumferential direction so that the radial dynamic lubricant pressure is increased in the second clearance according to the rotation of the rotary member.

4. A recording disk apparatus according to claim 1, wherein the thrust bearing portion extends radially inward to the radial bearing portion to form a fluidal communication therebetween.

5. A recording disk apparatus according to claim 1, wherein the shaft has an axially terminating end and a thrust member fixed onto the axially terminating end, and the thrust dynamic lubricant pressure is generated between the thrust member and the thrust bearing portion.

6. A recording disk apparatus according to claim 1, wherein the bearing further has an end surface which extends in the circumferential direction between the thrust bearing portion and the radial bearing portion to prevent a fluidal communication therebetween.

7. A recording disk apparatus according to claim 1, wherein an axial center of the radial bearing portion is arranged within an axial width of said at least one disk.

8. A recording disk apparatus comprising a disk for recording a signal thereon, a rotary member on which the disk is mounted, a rotational supporting device including a shaft and a bearing, one of the shaft and bearing being incorporated with the rotary member and being rotatable relative to the other of the shaft and bearing on an axis, and a lubricant in the rotational supporting device, wherein the bearing has a thrust bearing portion for generating a thrust dynamic lubricant pressure between the shaft and bearing in a thrust direction substantially parallel to the axis according to the rotation of the rotary member, and a radial bearing portion for generating a radial dynamic lubricant pressure between the shaft and bearing in a radial direction substantially perpendicular to the axis according to a rotation of the rotary member, and a first clearance between the shaft and the thrust bearing portion is tapered in a circumferential direction so that the thrust dynamic lubricant pressure is increased in the first clearance as a result of the rotation of the rotary member, wherein the second clearance between the shaft and the radial bearing portion is tapered in the circumferential direction so that the radial dynamic lubricant pressure is increased in the second clearance according to the rotation of the rotary member, wherein a position of a terminating end of the first clearance at which an axial distance between the thrust bearing portion and the shaft is substantially smallest in the thrust bearing portion is circumferentially aligned to a circumferential position of a second clearance at which a radial distance between the radial bearing portion and the shaft is substantially smallest in the radial bearing portion.

9. A recording disk apparatus according to claim 8, wherein the shaft has relatively large diameter cylindrical surfaces at respective axial ends thereof and a relatively small diameter cylindrical surface between the relatively large diameter cylindrical surfaces, and the relatively large diameter cylindrical surfaces generate the radial dynamic lubricant pressure with the radial bearing portion.

10. A recording disk rotating apparatus comprising, a rotary member adapted to hold a recording disk, a rotational supporting device including a shaft and a bearing, one of the shaft and bearing being incorporated with the rotary member and being rotatable relative to the other of the shaft and bearing on an axis, and a lubricant in the rotational supporting device, wherein the bearing has a thrust bearing portion for generating a thrust dynamic lubricant pressure between the shaft and bearing in a thrust direction substantially parallel to the axis according to the rotation of the rotary member, and a radial bearing portion for generating a radical dynamic lubricant pressure between the shaft and bearing in a radial direction substantially perpendicular to the axis according to a rotation of the rotary member, and a first clearance between the shaft and the thrust bearing portion is tapered in a circumferential direction so that the thrust dynamic lubricant pressure is increased in the clearance according to the rotation of the rotary member, wherein the apparatus further includes a lubricant circulating path which extends axially between the thrust bearing portion and the radial bearing portion to guide the lubricant flowing radially outward out of the thrust bearing portion toward the radial bearing portion.

11. A recording disk rotating apparatus comprising:

a rotary member adapted to hold a recording disk, a rotational supporting device including a shaft and a slide bearing, one of the shaft and slide bearing being incorporated with the rotary member and being rotatable relative to the other of the shaft and bearing on an axis, and a magnetic fluid lubricant in the rotational supporting device, wherein the slide bearing has a thrust bearing portion for generating a thrust dynamic lubricant pressure between itself and the shaft in a thrust direction substantially parallel to the axis according to the rotation of the rotary member, and a radial bearing portion for generating a radial dynamic lubricant pressure between itself and the shaft in a radial direction substantially perpendicular to the axis according to a rotation of the rotary member, and a first clearance between the shaft and the thrust bearing portion is tapered in a circumferential direction so that the thrust dynamic lubricant pressure is increased in the clearance according to the rotation of the rotary member, wherein one of the shaft and slide bearing is incorporated with the rotary member to form a rotary side and another one of which is incorporated with the stationary member to form a stationary side, for generating a slide dynamic lubricant pressure to support the rotary member on the stationary member in a rotatable manner on an axis, and a magnetic fluid seal device including a magnet holding the magnetic fluid lubricant between the rotary side and the stationary side, wherein, a slide clearance between the slide bearing and the magnetic fluid seal device is substantially filled with the magnetic fluid lubricant;

wherein the slide bearing has a throttle portion at a radially outer side of the thrust bearing portion to throttle a radial flow of the magnetic fluid lubricant from the thrust bearing portion to the magnetic fluid seal device.

12. A recording disk rotating apparatus comprising, a rotary member adapted to hold a recording disk, a rotational supporting device including a shaft and a bearing, one of the shaft and bearing being incorporated with the rotary member and being rotatable relative to another one thereof on an axis, and a lubricant in the rotational supporting device, wherein the bearing has a thrust bearing portion for generating a thrust dynamic lubricant pressure between the shaft and bearing in a thrust direction substantially parallel to the axis according to the rotation of the rotary member, and a radial bearing portion for generating a radial dynamic lubricant pressure between the shaft and bearing in a radial direction substantially perpendicular to the axis according to a rotation of the rotary member, and a first clearance between the thrust bearing portion is tapered in a circumferential direction so that the thrust dynamic lubricant pressure is increased in the clearance according to the rotation of the rotary member, wherein a position of a terminating end of the first clearance at which an axial distance between the thrust bearing portion and the shaft is substantially smallest in the thrust bearing portion is circumferentially aligned to a circumferential position of a second clearance at which a radial distance between the radial bearing portion and the shaft is substantially smallest in the radial bearing portion.

13. A recording disk rotating apparatus according to claim 20, wherein the bearing further includes a lubricant communication groove covered by the shaft, and the lubricant on the radial bearing portion communicates with the lubricant on the thrust bearing portion through the lubricant communication groove.

14. A recording disk rotating apparatus according to claim 12, wherein the rotary member is supported on a stationary member, said bearing is a slide bearing, and wherein one of said shaft and said slide bearing is incorporated with the rotary member to form a rotary side and another one of which is incorporated with the stationary member to form a stationary side, for generating a slide dynamic lubricant pressure to support the rotary member on the stationary member in a rotatable manner on an axis, the lubricant being a magnetic fluid lubricant, and a magnetic fluid seal device including a magnet holding the magnetic fluid lubricant between the rotary side and the stationary side, wherein, a clearance between the slide bearing and the magnetic fluid seal device is substantially filled with the magnetic fluid lubricant.

15. A recording disk rotating apparatus according to claim 14, wherein the magnetic fluid seal device is arranged at a radially outer side of the thrust bearing portion.

16. A recording disk rotating apparatus according to claim 14, wherein the slide bearing has a radial bearing portion for generating the radical dynamic lubricant pressure between the stationary and rotary sides in a radial direction substantially perpendicular to the axis according to a rotation of the rotary member, and the magnetic fluid seal device is arranged at a radially outer side of the radial bearing portion.

17. A recording disk rotating apparatus according to claim 14, wherein one of the rotary side and the stationary side has a helical groove thereon facing to another one thereof to urge air according to a rotation of the rotary member from an outside of the apparatus toward the magnetic fluid seal device.

18. A recording disk rotating apparatus according to claim 14, wherein the magnetic fluid seal device has a magnetically conductive member connected magnetically to the magnet, and a force in a thrust direction substantially parallel to the axis is transmitted between the stationary and rotary sides through the magnetically conductive member.

19. A recording disk rotating apparatus according to claim 14, wherein a magnetic flux generated by the magnet passes through the slide bearing.

20. A recording disk rotating apparatus according to claim 12, wherein the bearing further includes a lubricant communication groove covered by the shaft, and the lubricant on the radial bearing portion communicates with the lubricant on the thrust bearing portion through the lubricant communication groove.

21. A recording disk rotating apparatus according to claim 12, further comprising a stationary member on which the rotary member is supported, wherein the bearing is a slide bearing which includes a shaft and a bearing one of which is incorporated with the rotary member to form a rotary side and another one of which is incorporated with the stationary member to form a stationary side, for generating a dynamic lubricant pressure to support the rotary member on the stationary member in a rotatable manner on an axis, the lubricant being a magnetic fluid lubricant, and a magnetic fluid seal device including a magnet holding the magnetic fluid lubricant between the rotary side and the stationary side, wherein, a clearance between the slide bearing and the magnetic fluid seal device is substantially filled with the magnetic fluid lubricant.

22. A recording disk rotating apparatus comprising:

a rotary member adapted to hold a recording disk, a rotational supporting device including a shaft and a bearing, one of the shaft and bearing being incorporated with the rotary member and being rotatable relative to the other of the shaft and bearing on an axis, and a lubricant in the rotational supporting device, wherein the bearing has a thrust bearing portion for generating a thrust dynamic lubricant pressure between the shaft and bearing in a thrust direction substantially parallel to the axis according to the rotation of the rotary member, and a radial bearing portion for generating a radial dynamic lubricant pressure between the shaft and bearing in a radial direction substantially perpendicular to the axis according to a rotation of the rotary member, and a first clearance between the shaft and the thrust bearing portion is tapered in a circumferential direction so that the thrust dynamic lubricant pressure is increased in the clearance according to the rotation of the rotary member, wherein the apparatus further includes a lubricant circulating path which extends axially between the thrust bearing portion and the radial bearing portion to prevent the lubricant flowing out of the thrust bearing portion from returning directly to the thrust bearing portion without passing the radial bearing portion.

23. A recording disk rotating apparatus comprising:

a rotary member adapted to hold a recording disk;

a rotational supporting device including a shaft and a bearing, one of the shaft and bearing being incorporated with the rotary member and being rotatable relative to the other of the shaft and bearing on an axis; and a lubricant in the rotational supporting device; wherein the bearing has a thrust bearing portion for generating a thrust dynamic lubricant pressure between the shaft and bearing in a thrust direction substantially parallel to the axis as a result of rotation of the rotary member, and a radial bearing portion for generating a radial dynamic lubricant pressure between the shaft and bearing in a radial direction substantially perpendicular to the axis as a result of rotation of the rotary member, a first clearance between the shaft and the thrust bearing portion is tapered in a circumferential direction so that the thrust dynamic lubricant pressure is increased in the first clearance as a result of the rotation of the rotary member;

a second clearance between the shaft and the radial bearing portion is tapered in the circumferential direction so that the radial dynamic lubricant pressure is increased in the second clearance as a result of the rotation of the rotary member;

wherein the first clearance has a thrust bearing taper root portion at which an axial distance between the thrust bearing portion and the shaft is maximum, the second clearance has a radial bearing taper root portion at which a radial distance between the radial bearing portion and the shaft is maximum, and a circumferential position of the thrust bearing taper root portion is circumferentially aligned with a circumferential position of the radial bearing taper root portion.

24. A recording disk rotating apparatus comprising:

a rotary member adapted to hold a recording disk;

a rotational supporting device including a shaft and a bearing, one of the shaft and bearing being incorporated with the rotary member and being rotatable relative to another one thereof on an axis; and a lubricant in the rotational supporting device; wherein the bearing has thrust bearing portions for generating a thrust dynamic lubricant pressure between the shaft and bearing in a thrust direction substantially parallel to the axis as a result of rotation of the rotary member, and a radial bearing portion for generating a radial dynamic lubricant pressure between the shaft and bearing in a radial direction substantially perpendicular to the axis as a result of a rotation of the rotary member;

a first clearances between the shaft and the thrust bearing portion is tapered in a circumferential direction so that the thrust dynamic lubricant pressure is increased in the first clearances as a result of the rotation of the rotary member;

the bearing further includes a lubricant communication groove covered by the shaft, and the lubricant on the radial bearing portion communicates with the lubricant on the thrust bearing portion through the lubricant communication groove; and the tapered first clearances between the thrust bearing portions and the shaft are arranged substantially circumferentially symmetrically relative to the lubricant communication groove.

25. A recording disk rotating apparatus comprising:

a rotary member adapted to hold a recording disk;

a rotational supporting device including a shaft and a bearing, one of the shaft and bearing being incorporated with the rotary member and being rotatable relative to the other of the shaft and bearing on an axis; and a lubricant in the rotational supporting device; wherein the bearing has a thrust bearing portion for generating a thrust dynamic lubricant pressure between the shaft and bearing in a thrust direction substantially parallel to the axis as a result of rotation of the rotary member, and a radial bearing portion for generating a radial dynamic lubricant pressure between the shaft and bearing in a radial direction substantially perpendicular to the axis as a result of rotation of the rotary member;

the bearing further includes a lubricant communication groove covered by the shaft, and the lubricant on the radial bearing portion communicates with the lubricant on the thrust bearing portion through the lubricant communication groove;

a first clearance between the shaft and the thrust bearing portion is tapered in a circumferential direction so that the thrust dynamic lubricant pressure is increased in the first clearance as a result of rotation of the rotary member;

a second clearance between the shaft and the radial bearing portion is tapered in the circumferential direction so that the radial dynamic lubricant pressure is increased in the second clearance as a result of rotation of the rotary member; and the second clearance has a radial bearing taper root portion at which a radial distance between the radial bearing portion and the shaft is maximum, and the lubricant communication groove extends from the radial bearing taper root portion to the thrust bearing portion.

* * * * *